US012015269B2

(12) United States Patent
Nelson et al.

(10) Patent No.: US 12,015,269 B2
(45) Date of Patent: Jun. 18, 2024

(54) METHODS, SYSTEMS, AND APPARATUSES FOR THE RESET OF A SETPOINT FOR COMMITTED DEMAND

(71) Applicant: ENEL X S.R.L., Rome (IT)

(72) Inventors: Austin Nelson, Bend, OR (US); Cesar A. Silva-Monroy, Selah, WA (US); Srinikaeth Thirugnan Sambandam, Bellevue, WA (US)

(73) Assignee: Enel X S.R.L., Rome (IT)

( * ) Notice: Subject to any disclaimer, the term of this patent is extended or adjusted under 35 U.S.C. 154(b) by 0 days.

(21) Appl. No.: 17/119,635

(22) Filed: Dec. 11, 2020

(65) Prior Publication Data

US 2022/0190639 A1 Jun. 16, 2022

(51) Int. Cl.
*H02J 13/00* (2006.01)
*G05B 19/042* (2006.01)

(52) U.S. Cl.
CPC ...... *H02J 13/00002* (2020.01); *G05B 19/042* (2013.01); *G05B 2219/2639* (2013.01); *H02J 2310/12* (2020.01); *H02J 2310/50* (2020.01)

(58) Field of Classification Search
None
See application file for complete search history.

(56) References Cited

U.S. PATENT DOCUMENTS

| | | | |
|---|---|---|---|
| 4,141,069 A | 2/1979 | Fox | |
| 4,167,679 A | 9/1979 | Leyde et al. | |
| 4,475,685 A | 10/1984 | Grimado et al. | |
| 4,731,547 A | 3/1988 | Alenduff et al. | |
| 4,819,180 A | 4/1989 | Hedman et al. | |
| 5,873,251 A | 2/1999 | Iino | |
| 7,797,062 B2 | 9/2010 | Discenzo et al. | |
| 7,839,017 B2 | 11/2010 | Huizenga et al. | |
| 8,019,445 B2 | 9/2011 | Marhoefer | |
| 8,019,697 B2 | 9/2011 | Ozog | |
| 8,311,863 B1* | 11/2012 | Kemp | G06Q 10/0639 705/7.29 |
| 8,600,571 B2 | 12/2013 | Dillon et al. | |
| 8,880,233 B2* | 11/2014 | Kearns | H02J 4/00 700/297 |
| 8,886,361 B1* | 11/2014 | Harmon | G06Q 50/06 700/291 |
| 9,020,800 B2 | 4/2015 | Shelton et al. | |
| 9,436,179 B1 | 9/2016 | Turney et al. | |
| 9,865,024 B2 | 1/2018 | Mokhtari et al. | |
| 10,263,462 B2* | 4/2019 | Fife | H02J 7/00 |
| 2005/0065674 A1 | 3/2005 | Houpt et al. | |
| 2009/0048716 A1 | 2/2009 | Marhoefer | |
| 2009/0063257 A1 | 3/2009 | Zak et al. | |
| 2009/0319090 A1 | 12/2009 | Dillon et al. | |
| 2010/0174643 A1 | 7/2010 | Schaefer et al. | |

(Continued)

*Primary Examiner* — Jason Lin
(74) *Attorney, Agent, or Firm* — Foley & Lardner LLP

(57) ABSTRACT

The present disclosure is directed to systems, apparatuses, and methods for controlling an electrical system using setpoints. Some embodiments include systems that receive a meter read schedule comprising anticipated meter read occurrences. The systems may set a demand setpoint representing a desired upper limit of demand of the electrical power system and adjust the demand setpoint during a billing period. The system may also reset the demand setpoint multiple times at different reset points around each of the anticipated meter read occurrences.

21 Claims, 13 Drawing Sheets

(56) References Cited

U.S. PATENT DOCUMENTS

| | | |
|---|---|---|
| 2010/0179704 A1 | 7/2010 | Zog |
| 2010/0198421 A1 | 8/2010 | Fahimi et al. |
| 2010/0286840 A1* | 11/2010 | Powell .............. H02J 13/00034 700/295 |
| 2011/0071695 A1 | 3/2011 | Kouroussis et al. |
| 2011/0106328 A1 | 5/2011 | Zhou et al. |
| 2011/0218691 A1* | 9/2011 | O'Callaghan .......... G06Q 10/06 700/295 |
| 2012/0109390 A1 | 5/2012 | Delong et al. |
| 2012/0245749 A1* | 9/2012 | Littrell ...................... H02J 3/14 700/291 |
| 2012/0296482 A1 | 11/2012 | Steven et al. |
| 2012/0302092 A1 | 11/2012 | Kaps et al. |
| 2012/0319642 A1 | 12/2012 | Suyama et al. |
| 2012/0323389 A1 | 12/2012 | Shelton et al. |
| 2013/0013121 A1 | 1/2013 | Henze et al. |
| 2013/0030590 A1* | 1/2013 | Prosser .................... H02J 3/14 700/295 |
| 2013/0079939 A1 | 3/2013 | Darden, II et al. |
| 2013/0085616 A1 | 4/2013 | Wenzel |
| 2013/0166081 A1 | 6/2013 | Sanders et al. |
| 2013/0166084 A1 | 6/2013 | Sedighy et al. |
| 2013/0166234 A1 | 6/2013 | Chou et al. |
| 2013/0226358 A1 | 8/2013 | Rudkevich et al. |
| 2013/0226637 A1 | 8/2013 | Bozchalui et al. |
| 2013/0261817 A1 | 10/2013 | Detmers et al. |
| 2013/0261823 A1* | 10/2013 | Krok ........................ H02J 3/16 700/291 |
| 2013/0274935 A1* | 10/2013 | Deshpande .............. H02J 3/28 700/291 |
| 2013/0346139 A1 | 12/2013 | Steven et al. |
| 2014/0039965 A1 | 2/2014 | Steven et al. |
| 2014/0058572 A1 | 2/2014 | Stein et al. |
| 2014/0167705 A1 | 6/2014 | Chang et al. |
| 2014/0236369 A1 | 8/2014 | Kearns et al. |
| 2014/0266054 A1* | 9/2014 | Faries ....................... H02J 3/32 320/128 |
| 2014/0277797 A1* | 9/2014 | Mokhtari ........... G06Q 30/0202 700/291 |
| 2014/0350743 A1* | 11/2014 | Asghari ............... G05B 13/048 700/297 |
| 2014/0365022 A1 | 12/2014 | Ghosh et al. |
| 2015/0127425 A1 | 5/2015 | Greene et al. |
| 2015/0268307 A1 | 9/2015 | Inguva et al. |
| 2015/0355655 A1 | 12/2015 | Wang et al. |
| 2016/0011274 A1 | 1/2016 | Morita et al. |
| 2016/0041575 A1* | 2/2016 | Tadano .................... G05F 1/66 700/291 |
| 2016/0047862 A1 | 2/2016 | Shimizu et al. |
| 2016/0377686 A1 | 12/2016 | Uchida et al. |
| 2017/0093155 A1* | 3/2017 | Hannah .................. G06Q 50/06 |
| 2017/0099056 A1 | 4/2017 | Vickery et al. |
| 2017/0104343 A1 | 4/2017 | Eibsat et al. |
| 2017/0285111 A1 | 10/2017 | Fife |
| 2017/0285587 A1 | 10/2017 | Fife |
| 2017/0285678 A1 | 10/2017 | Fife |
| 2017/0286882 A1 | 10/2017 | Fife |
| 2017/0317528 A1 | 11/2017 | Fife |
| 2018/0258736 A1 | 9/2018 | Urdaneta |
| 2019/0042992 A1 | 2/2019 | Fife |
| 2020/0006940 A1* | 1/2020 | Fife ........................ G06Q 50/06 |

* cited by examiner

METHODS, SYSTEMS, AND APPARATUSES FOR THE RESET OF A SETPOINT FOR COMMITTED DEMAND

TECHNICAL FIELD

The present disclosure is directed to systems and methods for control of an electrical system, and more particularly to controllers and methods of controllers for controlling an electrical system.

BACKGROUND

Electricity supply and delivery costs continue to rise, especially in remote or congested areas. Moreover, load centers (e.g., population centers where electricity is consumed) increasingly demand more electricity. In the U.S. energy infrastructure is such that power is mostly produced by resources inland, and consumption of power is increasing at load centers along the coasts. Thus, transmission and distribution (T&D) systems are needed to move the power from where it is generated to where it is consumed at the load centers. As the load centers demand more electricity, additional T&D systems are needed, particularly to satisfy peak demand. However, a major reason construction of additional T&D systems is unwise and/or undesirable is because full utilization of this infrastructure is really only necessary during relatively few peak demand periods, and would otherwise be unutilized or underutilized. Justifying the significant costs of constructing additional T&D resources may make little sense when actual utilization may be relatively infrequent.

Distributed energy storage is increasingly seen as a viable means for minimizing rising costs by storing electricity at the load centers for use during the peak demand times. An energy storage system (ESS) can enable a consumer of energy to reduce or otherwise control a net consumption from an energy supplier. For example, if electricity supply and/or delivery costs are high at a particular time of day, an ESS, which may include one or more batteries or other storage devices, can generate/discharge electrical energy at that time when costs are high in order to reduce the net consumption from the supplier. Likewise, when electricity rates are low, the ESS may charge so as to have reserve energy to be utilized in a later scenario as above when supply and/or delivery costs are high.

An automatic controller may be beneficial to improve efficiency and potentially reduce costs of operation of an electrical system during peak demand times.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION

Figure 1:
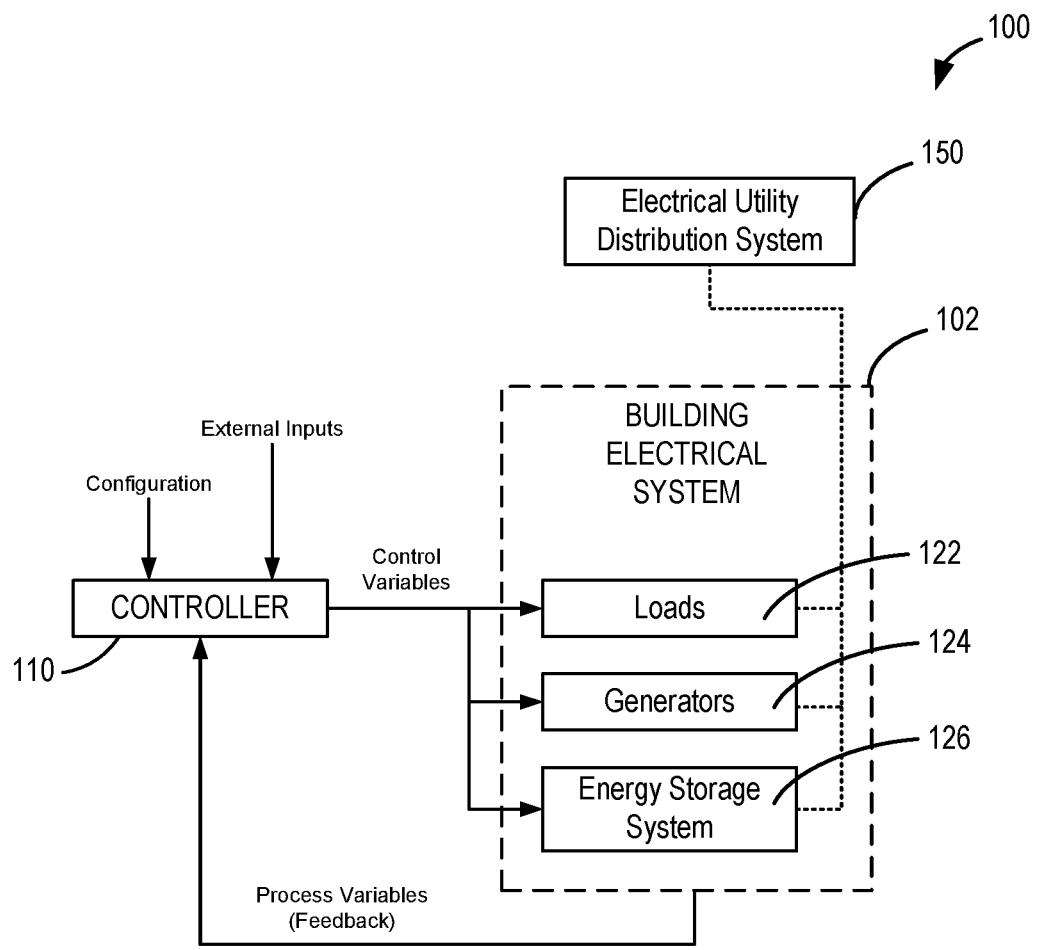
FIG. 1 is a block diagram illustrating a system architecture of a controllable electrical system, according to one embodiment of the present disclosure.

As electricity supply and delivery costs increase, especially in remote or congested areas, distributed energy storage is increasingly seen as a viable means for reducing those costs. An energy storage system (ESS) gives a local generator or consumer the ability to control net consumption and delivery of electrical energy at a point of interconnection. For example, if electricity supply and/or delivery costs (e.g., charges) are high at a particular time of day, an ESS can generate/discharge electrical energy from a storage system at that time to reduce the net consumption of a consumer (e.g., a building), and thus reduce costs to the consumer. Likewise, when electricity rates are low, the ESS may charge its storage system which may include one or more batteries or other storage devices. The lower-cost energy stored in the ESS can then be used to reduce net consumption and thus costs to the consumer at times when the supply and/or delivery costs are high.

One possible way in which ESSs can provide value is by reducing demand charges. Demand charges are electric utility charges that are based on the rate of electrical energy consumption (also referred to as "demand") during particular time windows (which may be referred to herein as "demand windows"). A precise definition of demand and the formula for demand charges may be defined in a utility's tariff document. For example, a tariff may specify that demand be calculated at given demand intervals (e.g., 15-minute intervals, 30-minute intervals, 40-minute intervals, 60-minute intervals, 120-minute intervals, etc.). The tariff may also define demand as being the average rate of electrical energy consumption over a previous period of time (e.g., the previous 15 minutes, 30 minutes, 40 minutes, etc.). In some embodiments, the tariff may specify that the demand be calculated instantaneously.

The previous period of time may or may not coincide with the demand interval. Demand may be expressed in units of power such as kilowatts (kW) or megawatts (MW). The tariff may describe one or more demand rates, each with an associated demand window (e.g., a period of time during which a demand rate applies). The demand windows may be contiguous or noncontiguous and may span days, months, or any other total time interval per the tariff. Also, one or more demand windows may overlap which means that, at a given time, more than one demand rate may be applicable. The demand windows may correspond to a billing period or billing cycle.

Demand charges for each demand window may be calculated as a demand rate multiplied by the maximum demand during the associated demand window. Demand rates in the United States may be expressed in dollars per peak demand ($/kW). As can be appreciated, demand tariffs may change from time to time, or otherwise vary, for example annually, seasonally, monthly, or daily. An automatic controller may be beneficial and may be desirable to enable intelligent actions to be taken as frequently as may be needed to utilize an ESS to reduce demand charges. As can be appreciated, an automatic controller that can automatically operate an electrical system to reduce demand charges using an ESS may be desirable and beneficial.

For example, the controller may attempt to reduce maximum demand during the associated demand window to reduce demand charges. To do this the controller may initialize a demand setpoint representing a desired upper limit of net consumption of power from a utility distribution system during the demand window. If the demand window is known and the net consumption exceeds the demand setpoint, some controllers may increase the demand setpoint to a peak of the net consumption during the demand window (since the demand charge is based on the peak demand), then decrease the setpoint when a new demand window begins.

However, the precise beginning and ending of the demand window may be unknown. For example, some utilities use human meter readers that inherently cannot read every meter at the same time. Meter readers may be early or late to read a meter. Thus, because the demand window timing may be based on when a meter is read, it can be difficult to know when a demand window ends and a new demand window begins.

Disclosed herein are embodiments that reset a setpoint value multiple times when there exists uncertainty in the meter read time. The multiple resets may occur near an anticipated meter read occurrence. The anticipated meter read occurrence may be a date or time that the demand window (e.g., billing period) is expected to end. Whether the anticipate meter read occurrence aligns with the actual meter read occurrence (or the possibility that the anticipated and actual meter read occurrences do not align) becomes immaterial. In some embodiments, the occurrences of the multiple resets may occur before and after the anticipated meter read occurrence. In some embodiments, the demand setpoint reset occurrences may occur only after the anticipated meter read occurrence.

Resetting the setpoint value may include returning the demand setpoint to a previous demand setpoint if the demand setpoint was raised during the previous demand window. Resetting the setpoint value may also include initializing the demand setpoint for a next demand window based on a forecast demand peak. For example, the controller may predict a demand consumption during a future time period and use that predicted demand value as the value to which the setpoint value is reset. In some embodiments, the demand setpoint value may be reset to a value that is based on historic load data. For example, a controller may reset the setpoint value to the maximum load of a past period such as the maximum load of a week, month, or year. In some embodiments, the setpoint value may be reset based on the historic load data and a battery rating. For example, if the maximum load for the past year was 800kW and the electrical system has a battery that is rated at 500 kW, the controller may reset the setpoint value to 300kW. Resetting the setpoint value may also include setting the value to a nominal value that will be exceeded at during the upcoming demand window. In some embodiments, the demand setpoint may be reset to 0 kW. In some embodiments, the demand setpoint may be reset to the most recently measured load value.

Controlling Electrical Systems

An electrical system, according to some embodiments, may include one or more electrical loads, generators, and ESSs. An electrical system may include all three of these components (loads, generators, ESSs), or may have varying numbers and combinations of these components. For example, an electrical system may have loads and an ESS, but no local generators (e.g., photovoltaic, wind, combustion, fuel cell). The electrical system may or may not be connected to an electrical utility distribution system (or "grid").

An ESS of an electrical system may include one or more storage devices and any number of power conversion devices. The power conversion devices are able to transfer energy between an energy storage device and the main electrical power connections that in turn connect to the electrical system loads and, in some embodiments, to the grid. The energy storage devices may be different in different implementations of the ESS. A battery is a familiar example of a chemical energy storage device. For example, in one embodiment of the present disclosure, one or more electric vehicle batteries is connected to an electrical system and can be used to store energy for later use by the electrical system. A flywheel is an example of a mechanical energy storage device.

FIG. 1 is a control diagram of an electrical system 100, according to one embodiment of the present disclosure. Stated otherwise, FIG. 1 is a representative diagram of a system architecture of an electrical system 100 including a controller 110, according to one embodiment. The electrical system 100 comprises a building electrical system 102 that is controlled by the controller 110. The building electrical system 102 includes one or more loads 122, one or more generators 124, and an energy storage system (ESS) 126. The building electrical system 102 is coupled to an electrical utility distribution system 150, and therefore may be considered on-grid.

The controller 110 uses one or more setpoints to control the consumption of electrical energy by the building electrical system 102. The controller may reset demand setpoints multiple times around when the meter read is supposed to occur (e.g., an anticipated meter read occurrence) to reduce a maximum power measurement during demand windows. By performing multiple resets around the anticipated meter read occurrence or time, the maximum power measurement may be lowered (e.g., after an actual meter read occurrence) for an upcoming demand window. The maximum power measurement may be used by a utility to determine a customer's bill. By lowering the maximum power measurement, the customer may conserve power and reduce charges related to a demand window.

Resetting the demand setpoints multiple times around the anticipated meter read occurrence may have significant benefits for the efficiency of the electrical system 100. Resetting the demand setpoints multiple times may make it more likely that the demand setpoints are reset close (near in time) to an actual meter read occurrence.

Further, by confining the resets to around the time of the meter read, the controller 110 may limit the likelihood that the demand setpoint is artificially low for a demand window. An artificially low demand setpoint may be caused by resetting the demand setpoint after the largest maximum power measurement has been recorded for a demand window. If the demand setpoint is reset after the maximum power measurement, the controller 110 may attempt to keep the electrical system 100 at a committed demand that is lower than necessary for the demand window.

Similarly, the multiple resets may limit an artificially high demand setpoint. For example, if the committed demand is based on a maximum power measurement that occurred before the meter is read, the controller may set the demand setpoint of the electrical system 100 higher than necessary, which results in a less optimized committed demand for the next demand window.

In some embodiments, the multiple resets may occur before and after the anticipated meter read occurrence (thereby increasing a chance that one of the multiple resets occurs after or otherwise aligns with the actual meter read occurrence). For example, in some embodiments, the demand setpoints may be reset before the anticipated meter read occurrence, on the anticipated meter read occurrence, and after the anticipated meter read occurrence. In some embodiments, the demand setpoint may be reset one or more times before the anticipated meter read occurrence and one or more times after the anticipated meter read occurrence. For example, in some embodiments, the demand setpoint reset may occur a day before the anticipated meter read occurrence, the day of the anticipated meter read occurrence, and the day after the anticipated meter read occurrence. In other embodiments, the demand setpoint reset may occur two days prior to the anticipated meter read occurrence, one day anticipated meter read occurrence, on the anticipated meter read occurrence, a day after the anticipated meter read occurrence, and two days after the anticipated meter read occurrence. Additional demand setpoint resets may be added. The multiple demand setpoint resets may result in one of the resets being near the actual meter read. As long as the actual meter read occurrence occurs within the period between the initial demand setpoint reset and the ultimate demand setpoint reset or close (near in time) to the first or last reset, efficiencies of the system are achieved including a lowered maximum power measurement for the upcoming demand window for use by a utility to determine a customer's bill, thereby conserving power and reducing charges related to a demand window, as will be more fully illustrated.

In some embodiments, the demand setpoint reset occurrences may occur only after the anticipated meter read occurrence. For example, the demand setpoint reset may occur on the anticipated meter read occurrence and the day after the anticipated meter read occurrence. While the previous example only included two resets, more resets may be used.

While the examples above describe 24-hour periodic demand setpoint resets around the anticipated meter read occurrence, the reset frequency may be different in some embodiments. The reset frequency describes the number of resets for a period of time. In some embodiments the reset frequency may be one reset every 24 hours. In some embodiments, the reset frequency may be less than 24 hours such as every 12 hours, greater than 24 hours, or even an arbitrary number of hours (including at regular or irregular intervals). In some embodiments, the demand setpoint reset may be set to a specific time such as midnight, noon, or one-o'clock. The specific time of the demand setpoint reset may be defined to be anytime of the day or night. The specific time may be set by the user or may be factory configured or otherwise a pre-set or default configuration.

In some embodiments, the reset frequency may change over time. For example, in some embodiments, the resets may occur more frequently during times nearest the anticipated meter read occurrence. In some embodiments, more resets may occur more frequently after the anticipated meter read occurrence than before the anticipated meter read occurrence.

Resetting the demand setpoint may cause the controller to change the demand setpoint according to a preset configuration. For example, in some embodiments, resetting the setpoint value may include returning the demand setpoint to a previous demand setpoint if the demand setpoint was raised during the previous demand window. In some embodiments, resetting the setpoint value may also include initializing the demand setpoint for a next demand window based on a forecast demand peak. For example, the a controller may predict a demand consumption during a future time period and use that predicted demand value as the value to which the setpoint value is reset. In some embodiments, the demand setpoint value may be reset to a value that is based on historic load data. For example, a controller may reset the setpoint value to the maximum load of a past period such as the maximum load of a week, month, or year. In some embodiments, the setpoint value may be reset based on the historic load data and a battery rating. For example, if the maximum load for the past year was 800kW and the electrical system has a battery that is rated at 500 kW, the controller may reset the setpoint value to 300kW. In some embodiments, resetting the setpoint value may also include setting the value to a nominal value that will be exceeded at or during the upcoming demand window. In some embodiments, the demand setpoint may be reset to 0 kW. In some embodiments, the demand setpoint may be reset to the most recently measured load value.

The controller 110 may initialize the demand setpoint for the demand window from one of the reset points. In some embodiments, the controller 110 may use a demand setpoint from after a last reset point to initiate the demand setpoint for a billing cycle. In some embodiments, the controller 110 may track demand setpoints between the different reset points and for an equivalent period after a last reset point, and use a lowest demand setpoint from the tracked demand setpoints to initiate the demand setpoint for a billing cycle. In some embodiments, the controller 110 may determine which of the tracked demand setpoints based on a minimum setpoint of a maxium of different demand setpoint sets. For example, the setpoint value that is used for the future billing cycle may be determined by solving the following equation.

$$X_S = \min_{j=1...N} \left[ \max_{K=j...N} [X_K, X_{K+1}...X_N] \right]$$

where:

$X_K, X_{K+1}, \ldots X_N$ represent sets of tracked demand setpoints, each set comprising the tracked demand setpoint values after each reset point, and $X_S$ represents the the setpoint value that is used for the future billing cycle.

In the control diagram of FIG. 1, the controller 110 is shown on the left-hand side and the building electrical system 102, sometimes called the "plant," is on the righthand side. The controller 110 may include electronic hardware and software in one embodiment. In one example arrangement, the controller 110 includes one or more processors and suitable storage media, which store programming in the form of executable instructions which are executed by the processors to implement the control processes. In some embodiments, the building electrical system 102 is the combination of all local loads 122, local generators 124, and the ESS 126.

Loads are consumers of electrical energy within an electrical system. Examples of loads are air conditioning systems, motors, electric heaters, etc. The sum of the loads' electricity consumption rates can be measured in units of power (e.g., kW) and simply called "load" (e.g., a building load).

Generators may be devices, apparatuses, or other means for generating electrical energy within an electrical system. Examples are solar photovoltaic systems, wind generators, fuel cells, combined heat and power (CHP) systems, and diesel generators or "gen-sets." The sum of electric energy generation rates of the generators 124 can be measured in units of power (e.g., kW) and simply referred to as "generation."

As can be appreciated, loads may also generate at certain times. An example may be an elevator system that is capable of regenerative operation when the carriage travels down.

Unadjusted net power may refer herein to load minus generation in the absence of active control by a controller described herein. For example, if at a given moment a building has loads consuming 100 kW, and a solar photovoltaic system generating at 25 kW, the unadjusted net power is 75 kW. Similarly, if at a given moment a building has loads consuming 70 kW, and a solar photovoltaic system generating at 100 kW, the unadjusted net power is −30 kW. As a result, the unadjusted net power is positive when the load energy consumption exceeds generation and negative when the generation exceeds the load energy consumption.

ESS power refers herein to a sum of a rate of electric energy consumption of an ESS. If ESS power is positive, an ESS is charging (consuming energy). If ESS power is negative, an ESS is generating (delivering energy).

Adjusted net power refers herein to unadjusted net power plus the power contribution of any controllable elements such as an ESS. Adjusted net power is therefore the net rate of consumption of electrical energy of the electrical system considering all loads, generators, and ESSs in the system, as controlled by a controller described herein.

Unadjusted demand is demand defined by the locally applicable tariff, but only based on the unadjusted net power. In other words, unadjusted demand does not consider the contribution of any ESS.

Adjusted demand or simply "demand" is demand as defined by the locally applicable tariff, based on the adjusted net power, which includes the contribution from any and all controllable elements such as ESSs. Adjusted demand is the demand that can be monitored by the utility and used in the demand charge calculation.

Referring again to FIG. 1, the building electrical system 102 may provide information to the controller 110, such as in a form of providing process variables. The process variables may provide information, or feedback, as to a status of the building electrical system 102 and/or one or more components (e.g., loads, generators, ESSs) therein. For example, the process variable may provide one or more measurements of a state of the building electrical system 102.

The controller 110 receives the process variables for determining values for control variables to be communicated to the building electrical system 102 to effectuate a change to the building electrical system 102 toward meeting a controller objective for the building electrical system 102. For example, the controller 110 may provide a control variable to adjust the load 122, to increase or decrease generation by the generator 124, and to utilize (e.g., charge or discharge) the ESS 126. The controller 110 may also receive a configuration (e.g., a set of configuration elements), which may specify one or more constraints of the electrical system 102. The controller 110 may also receive external inputs (e.g., weather reports, changing tariffs, fuel costs, event data), which may inform the determination of the values of the control variables. A set of external inputs may be received by the controller 110. The set of external inputs may provide indication of one or more conditions that are external to the controller and the electrical system.

As noted, the controller 110 may attempt to meet certain objectives by changing a value associated with one or more control variables, if necessary. The objectives may be predefined, and may also be dependent on time, on any external inputs, on any process variables that are obtained from the building electrical system 102, and/or on the control variables themselves. Some examples of controller objectives for different applications are:

Minimize demand (kW) over a prescribed time interval;
Minimize demand charges ($) over a prescribed time interval;
Minimize total electricity charges ($) from the grid;
Reduce demand (kW) from the grid by a prescribed amount during a prescribed time window; and
Maximize the life of the energy storage device.

Objectives can also be compound—that is, a controller objective can comprise multiple individual objectives. One example of a compound objective is to minimize demand charges while maximizing the life of the energy storage device. Other compound objectives including different combinations of the individual objectives are possible.

The inputs that the controller 110 may use to determine (or otherwise inform a determination of) the control variables can include configuration, external inputs, and process variables.

Process variables are typically measurements of the electrical system state and are used by the controller 110 to, among other things, determine how well its objectives are being met. These process variables may be read and used by the controller 110 to generate new control variable values. The rate at which process variables are read and used by the controller 110 depends upon the application but typically ranges from once per millisecond to once per hour. For battery energy storage system applications, the rate is often between 10 times per second and once per 15 minutes. Examples of process variables may include:

Unadjusted net power
Unadjusted demand
Adjusted net power
Demand
Load (e.g., load energy consumption for one or more loads)
Generation for one or more loads
Actual ESS charge or generation rate for one or more ESSs
Frequency
Energy storage device state of charge (SoC) (%) for one or more ESSs Energy storage device temperature (deg. C) for one or more ESSs Electrical meter outputs such as kilowatt-hours (kWh) or demand.

A configuration received by the controller 110 (or input to the controller 110) may include and/or be received as one or more configuration elements (e.g., a set of configuration elements). The configuration elements may specify one or more constraints associated with operation of the electrical system. The configuration elements may define one or more cost elements associated with operation of the electrical system 102. Each configuration element may set a status, state, constant or other aspect of the operation of the electrical system 102. The configuration elements may be values that are typically constant during the operation of the controller 110 and the electrical system 102 at a particular location. The configuration elements may specify one or more constraints of the electrical system and/or specify one or more cost elements associated with operation of the electrical system.

Examples of configuration elements may include:

ESS type (for example if a battery: states of charge, chemistry, manufacturer, and cell model)

ESS configuration (for example, if a battery: number of cells in series and parallel) and constraints (such as maximum charge and discharge powers)

ESS efficiency properties

ESS degradation properties (as a function of SoC, discharge or charge rate, and time)

Electricity supply tariff (including time of use supply rates and associated time windows)

Electricity demand tariff (including demand rates and associated time windows)

Electrical system constraints such as minimum power import

ESS constraints such as SoC limits or power limits (including maximum and minimum state of charge)

Historic data such as unadjusted net power or unadjusted demand, weather data, and occupancy Operational constraints such as a requirement for an ESS to have a specified minimum amount of energy at a specified time of day.

External inputs are variables that may be used by the controller 110 and that may change during operation of the controller 110. Examples are weather forecasts (e.g., irradiance for solar generation and wind speeds for wind generation) and event data (e.g., occupancy predictions). In some embodiments, tariffs (e.g., demand rates defined therein) may change during the operation of the controller 110, and may therefore be treated as an external input.

The outputs of the controller 110 are the control variables that can affect the electrical system behavior. Examples of control variables are:

ESS power command (kW or %). For example, an ESS power command of 50 kW would command the ESS to charge at a rate of 50 kW, and an ESS power command of −20 kW would command the ESS to discharge at a rate of 20 kW Building or subsystem net power increase or reduction (kW or %)

Renewable energy increase or curtailment (kW or %). For example a photovoltaic (PV) system curtailment command of −100 kW would command a PV system to limit generation to no less than −100 kW. Again, the negative sign is indicative of the fact that the value is generative (non-consumptive)

A demand setpoint representative of an upper limit on demand.

In some embodiments, control variables that represent power levels may be signed, e.g., positive for consumptive or negative for generative.

In one illustrative example, consider that an objective of the controller 110 may be to reduce demand charges while preserving battery life. In this example, only the ESS may be controlled. To accomplish this objective, the controller should have knowledge of a configuration of the electrical system 102, such as the demand rates and associated time windows, the battery capacity, the battery type and arrangement, etc. Other external inputs may also be used to help the controller 110 meet its objectives, such as a forecast of upcoming load and/or forecast of upcoming weather (e.g., temperature, expected solar irradiance, wind). Process variables from the electrical system 102 that may be used may provide information concerning a net electrical system power or energy consumption, demand, a battery SoC, an unadjusted building load, and an actual battery charge or discharge power.

In this one illustrative example, the control variable may be a commanded battery ESS's charge or discharge power. In order to more effectively meet the objective, the controller 110 may continuously track the peak adjusted net power (kW) for the building over each applicable time window, and use the battery to charge or generate at appropriate times to limit the demand charges. In one specific example scenario, the ESS may be utilized to attempt to achieve substantially flat (or constant) demand from the electrical utility distribution system 150 (e.g., the grid) during an applicable time window when a demand charge applies.

Figure 2:
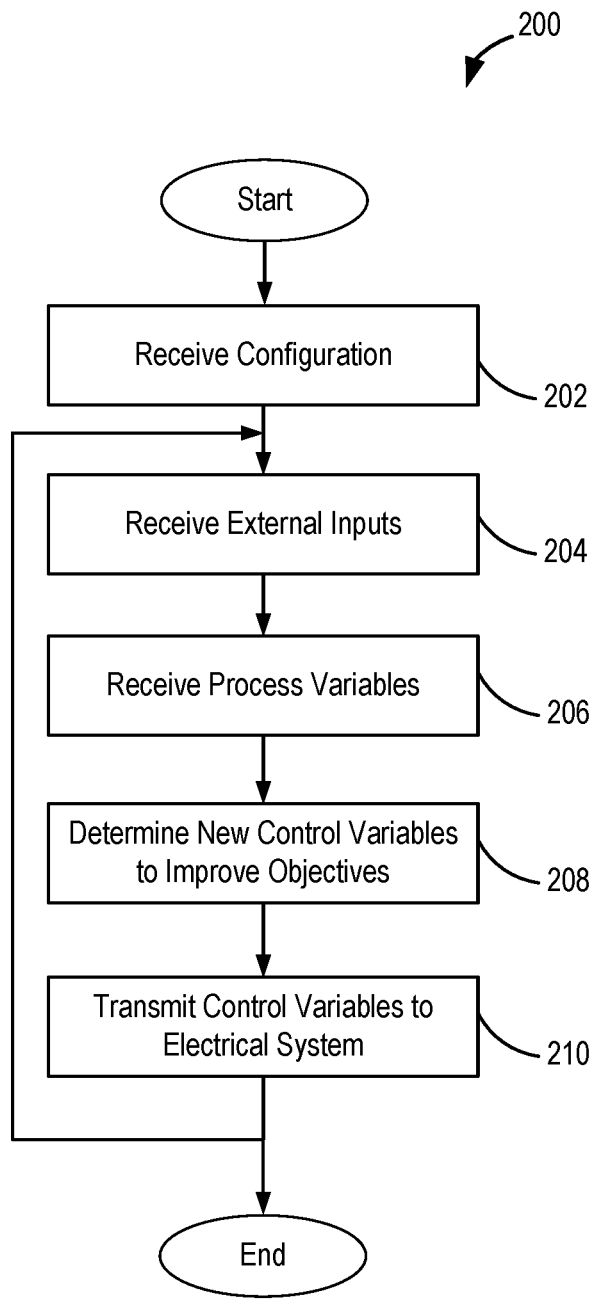
FIG. 2 is a flow diagram of a method or process of controlling an electrical system, according to one embodiment of the present disclosure.

FIG. 2 is a flow diagram of a method 200 or process of controlling an electrical system, according to one embodiment of the present disclosure. The method 200 may be implemented by a controller of an electrical system, such as the controller 110 of FIG. 1 controlling the building electrical system 102 of FIG. 1. The controller may receive 202 or otherwise receive a configuration (e.g., a set of configuration elements) of the electrical system.

The controller may also receive 204 or otherwise receive external inputs, such as weather reports (e.g., temperature, solar irradiance, wind speed), changing tariffs, event data (e.g., occupancy prediction, sizeable gathering of people at a location or venue), and the like.

The controller may also receive 206 or otherwise receive process variables, which may be measurements of a state of the electrical system and indicate, among other things, how well objectives of the controller are being met. The process variables provide feedback to the controller as part of a feedback loop.

Using the configuration, the external inputs, and/or the process variables, the controller determines 208 new control variables to improve achievement of objectives of the controller. Stated differently, the controller determines 208 new values for each control variable to effectuate a change to the electrical system toward meeting one or more controller objectives for the electrical system. One control variable that is determined is a demand setpoint to limit a peak of the adjusted demand of the building. Once determined, the control variables (or values thereof) are transmitted 210 to the electrical system or components of the electrical system. The transmission 210 of the control variables to the electrical system allows the electrical system to process the control variables to determine how to adjust and change state, which thereby can effectuate the objective(s) of the controller for the electrical system. In determining new control variables the controller may determine a demand setpoint to limit a peak of the adjusted demand of the building. The demand setpoint may be determined based on a previous demand setpoint and the peak adjusted net power. For example, if the previous demand setpoint was exceeded by the peak adjusted demand the demand setpoint may be set to a higher value than the previous demand setpoint. If the previous demand setpoint was not exceeded by the peak adjusted demand the demand setpoint may be set to a lower value than the previous demand setpoint. Near the beginning of each demand window (e.g., at or around the anticipated meter read occurrence), the controller may reset the demand setpoint multiple times to initiate the demand setpoint for a future billing cycle.

Figure 3:
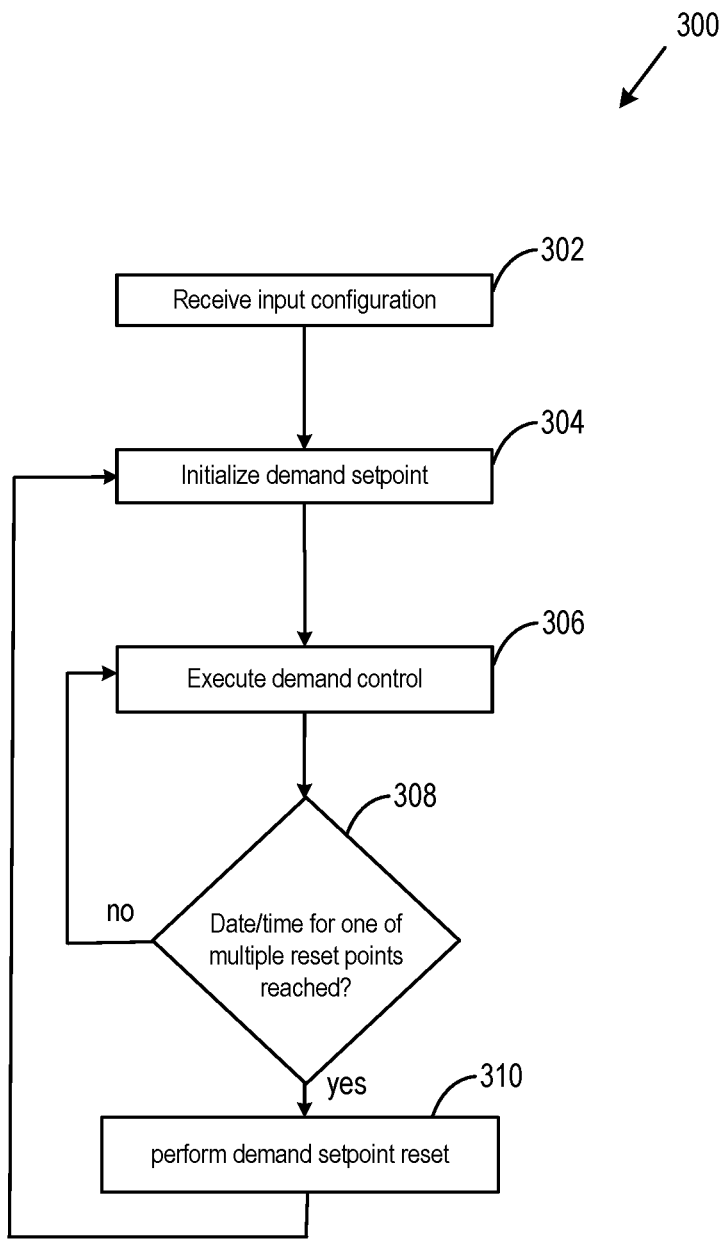
FIG. 3 is a flow diagram of a method of controlling an electrical system with a demand setpoint, according to one embodiment of the present disclosure.

FIG. 3 is a flow diagram of a method 300 of controlling an electrical system with a demand setpoint, according to one embodiment of the present disclosure. The method 300 may be a computer-implemented process executed by one or more computing devices (e.g., controller 110 of FIG. 1).

The method 300 may adjust the demand setpoint based on the adjusted demand of an electrical system. In some embodiments, the demand setpoint may be a control variable provided to the electrical system to effectuate a change in the electrical system. In some embodiments, additional steps may be taken to determine control variables based on the demand setpoint and those additional control variables may be provided to the electrical system. For example, an ESS power command, a building or subsystem net power increase or reduction command, a renewable energy increase or curtailment command, or a generator increase or curtailment command may be provided to the electrical system to effectuate a change to the electrical system to attempt to comply with the demand setpoint.

The method 300 may receive 302 a configuration, or a set of configuration elements, of the electrical system. The configuration may specify one or more constraints of the electrical system. For example, the configuration may specify battery performance parameters, battery energy capacity, maximum battery charge and discharge rates, minimum import constraints, anticipated meter read occurrence, and the applicable utility tariff. The configuration may specify one or more constants of the electrical system. The configuration may specify one or more cost elements associated with operation of the electrical system. The cost elements may include one or more of an electricity cost (e.g., an electricity supply charge, an electricity demand charge), a battery degradation cost, equipment degradation cost, a tariff definition (e.g., an electricity supply tariff providing time of use (ToU) supply rates and associated time windows, or an electricity demand tariff providing demand rates and associated time windows), a cost of local generation, penalties associated with deviation from an operating plan (e.g., a prescribed operating plan, a contracted operating plan), costs or benefits associated with a change in energy in the ESS such that adding energy between the beginning and the end of the future time domain is valued, costs or benefits (e.g., a payment) for contracted maneuvers, costs or benefits associated with the amount of energy stored in an ESS as a function of time, a value of comfort that may be a function of other process variables such as building temperature.

The method 300 may initialize 304 a demand setpoint. A demand setpoint represents an upper limit on demand (i.e., adjusted demand). A demand setpoint may be a value, a constant, or a variable that may be set to a value. In some embodiments, the demand setpoint may be initialized to an arbitrary number. In some embodiments, the demand setpoint may be initialized to a nominal value. In some embodiments, a user may set the initial demand setpoint. In some embodiments, a controller may determine a max adjusted demand of the electrical system and initialize a setpoint at the max adjusted demand. In some embodiments, a controller may determine an average adjusted demand of the electrical system and initialize a setpoint at the average adjusted demand. In some embodiments, a controller may predict a demand consumption during a future time period of the electrical power system based on historic load data.

A controller using method 300 may execute 306 demand control. The demand control may attempt to keep the net consumption of power from a utility distribution system below the demand setpoint for a demand window. If the controller is not able to maintain the net consumption below the demand setpoint, the controller may increase the demand setpoint for the demand window.

The controller using method 300 may determine 308 if a reset point has been reached. The reset point may be a time and/or date near the anticipated meter read occurrence. The reset point may be pre-configured or set by a user. The reset point may occur before the anticipated meter read occurrence, on the anticipated meter read occurrence, or after the anticipated meter read date. If the reset point has not been reached, the controller may continue to execute 306 the demand control. The reset point may be one of a multiple reset points in a set. The set of reset points may be a list of dates/times where demand setpoint resets are to occur. The set of reset points may be scheduled around the anticipated meter read occurrence. In some embodiments, a user may choose to add to this list even after a first reset has occurred.

If the reset point has been reached, the controller may perform 310 a multi-reset procedure to repeatedly reset the demand setpoint, such as according to a schedule or at intervals (e.g., regular or irregular/arbitrary). This multi-reset procedure causes the demand setpoint to be reduced or reset multiple times around the anticipated meter read occurrence. The multi-reset procedure may include two or more reset points that are scheduled based on the anticipated meter read occurrence.

For example, the demand setpoint can be reset on the anticipated meter read occurrence and both one day before and after the anticipated meter read occurrence. In some embodiments, additional resets may occur. For example, in some embodiments, the demand setpoint reset may occur two days prior to the anticipated meter read occurrence, one day prior to the anticipated meter read occurrence, on the anticipated meter read occurrence, a day after the anticipated meter read occurrence, and two days after the anticipated meter read occurrence. Additional demand setpoint resets may be added. In some embodiments, the demand setpoint reset occurrences may occur only after the anticipated meter read occurrence. For example, the demand setpoint reset may occur on the anticipated meter read occurrence and the day after the anticipated meter read occurrence. While the previous example only included two resets, more resets may be used.

In some embodiments, the demand setpoint reset applies to multiple setpoint values associated with different rates. For example, the controller may reset both a first setpoint value associated with an on-peak rate and a second setpoint value associated with an off-peak rate at the same reset point. The multiple setpoint values may be reset even if one or more of the setpoint values is not currently active (e.g., an on-peak setpoint value during off-peak hours). In some embodiments, setpoint values associated with seasonal rates may be reset at each reset point. In some embodiments, each setpoint value may be reset to different values. The various values for the multiple setpoints may be based on historic behavior of the electrical system during a corresponding rate period.

While the examples above describe a daily demand setpoint reset around the anticipated meter read occurrence, the reset frequency may be different in some embodiments. In some embodiments the reset frequency may be one reset every 24 hours. In some embodiments, the reset frequency may be less than 24 hours such as every 12 hours, greater than 24 hours, or even an arbitrary number of hours. In some embodiments, the demand setpoint reset may be set to a specific time such as midnight, noon, or one-o'clock. The specific time of the demand setpoint reset may be defined to be anytime of the day or night. The specific time may be set by the user or may be factory configured or otherwise a pre-set or default configuration.

In some embodiments, the controller may use the demand setpoint to optimize the electrical system for the current conditions. In some embodiments, the controller may determine the demand setpoint and predict a load of the electrical system during a future time. The controller may then optimize the electrical system for the determined demand setpoint and the predicted load of the electrical system.

In many jurisdictions, demand charges are based on the maximum demand during a billing cycle (often monthly). In these situations, a controller may be configured to reduce or reset one or more demand setpoints at the start of each billing cycle (which is generally also the end of the previous billing cycle). When the setpoint is reduced substantially or reset, the controller begins again striving for low demand charges during a new billing cycle. But in some cases, it may not be possible or convenient to know the date and time at which each billing cycle begins. Or, the billing cycle change may depend upon a technician visiting and reading a smart meter at the customer's point of interconnect, in which case it may be very difficult to predict or know exactly when the smart meter is read. Thus, an alternate approach may be used in which the demand setpoint is reset multiple times near the anticipated meter read occurrence. Using this approach eliminates complexity in the controller design and may result in demand charge reduction that is as good or better than resetting setpoints at the beginning of the billing cycle.

FIGS. 4-8 illustrate a series of graphs that demonstrate benefits of a controller resetting the demand setpoint multiple times around an anticipated meter read. Each graph illustrates a same adjusted net power of an electrical system over a same ten-day period. While the following embodiments illustrate a single setpoint value being reset, the principles may be applied to resetting multiple setpoint values simultaneously.

Figure 4:
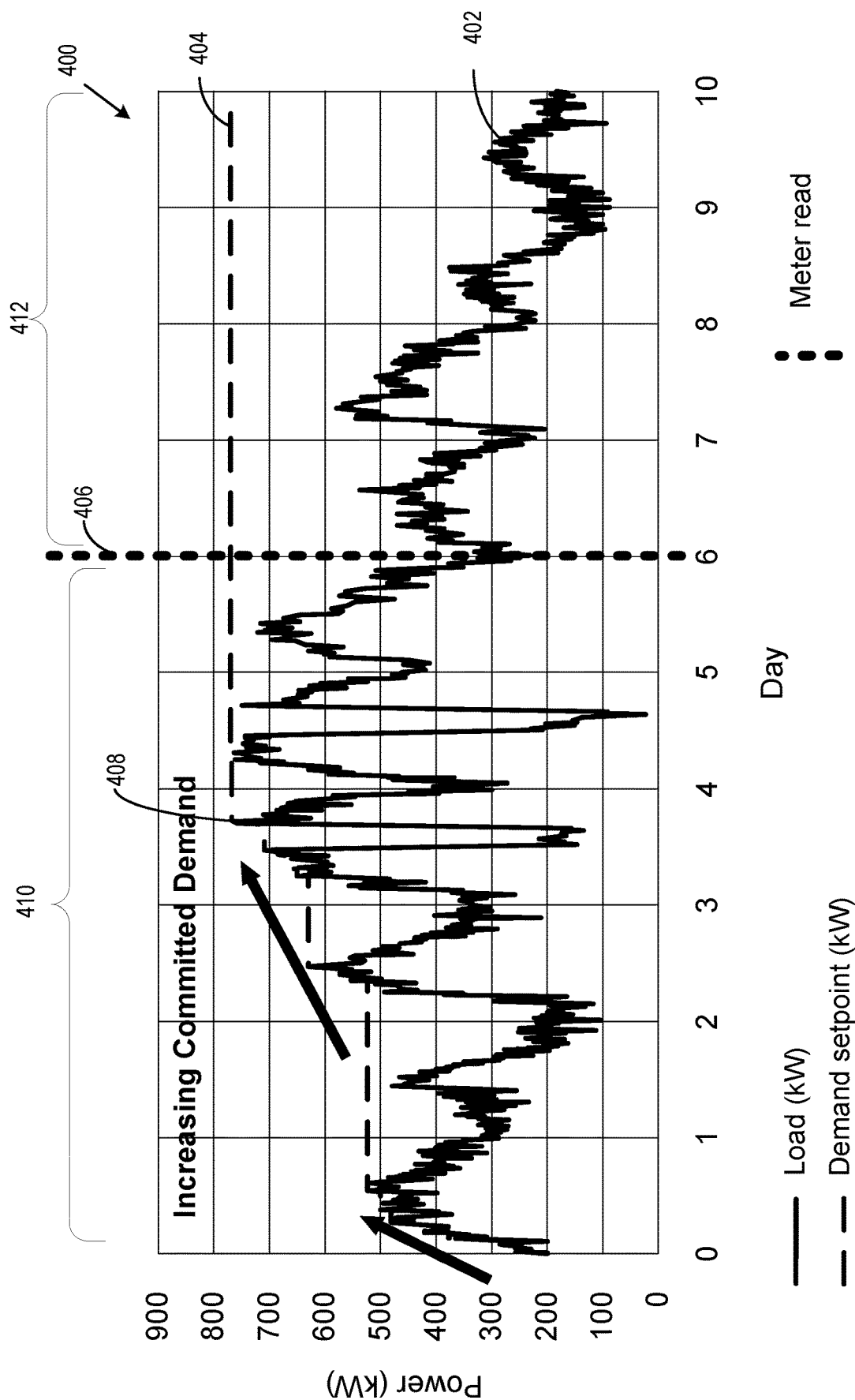
FIG. 4 illustrates a graph of an adjusted net power and a demand setpoint that is not reset after a meter read.

FIG. 4 illustrates a graph 400 of an adjusted net power 402 and a demand setpoint 404 that is not reset after a meter read 406. Many utilities bill customers based on the largest maximum power measurement 408 within a given billing period. The billing period is the time between meter reads and may also be referred to as a demand window. The billing period may be one month in length. However, there can be variability on when the billing ("meter read") occurs, creating uncertainty on when the demand setpoint 404 should be reset.

Thus, if the demand setpoint 404 is not reset at the correct time, the system may believe that the electrical system is already paying a higher demand charge and not attempt to optimize the system as much as it could. The demand setpoint 404 may be the basis for many control decisions in an electrical system. By tracking the maximum power measurement 408 (which may be used to set the demand setpoint 404), a controller may identify an optimized scenario for reducing a demand charge.

It is not useful to control to a demand setpoint any lower than what has been previously occurred within a billing period since the resulting demand charge will already have been established. Therefore, the controller may increase the demand setpoint 404 within a given billing period. For example, at the largest maximum power measurement 408, the demand setpoint 404 is increased.

It is desirous to decrease the demand setpoint 404 after each billing period (e.g., first demand window 410, and second demand window 412). In FIG. 4 the demand setpoint 404 is not reset. Accordingly, the demand setpoint 404 is unnecessarily high, which results in a less optimized committed demand for the second demand window 412. If the demand setpoint 404 were reset at the meter read 406, the controller may be able to better optimize the demand charge during the second demand window 412.

Figure 5:
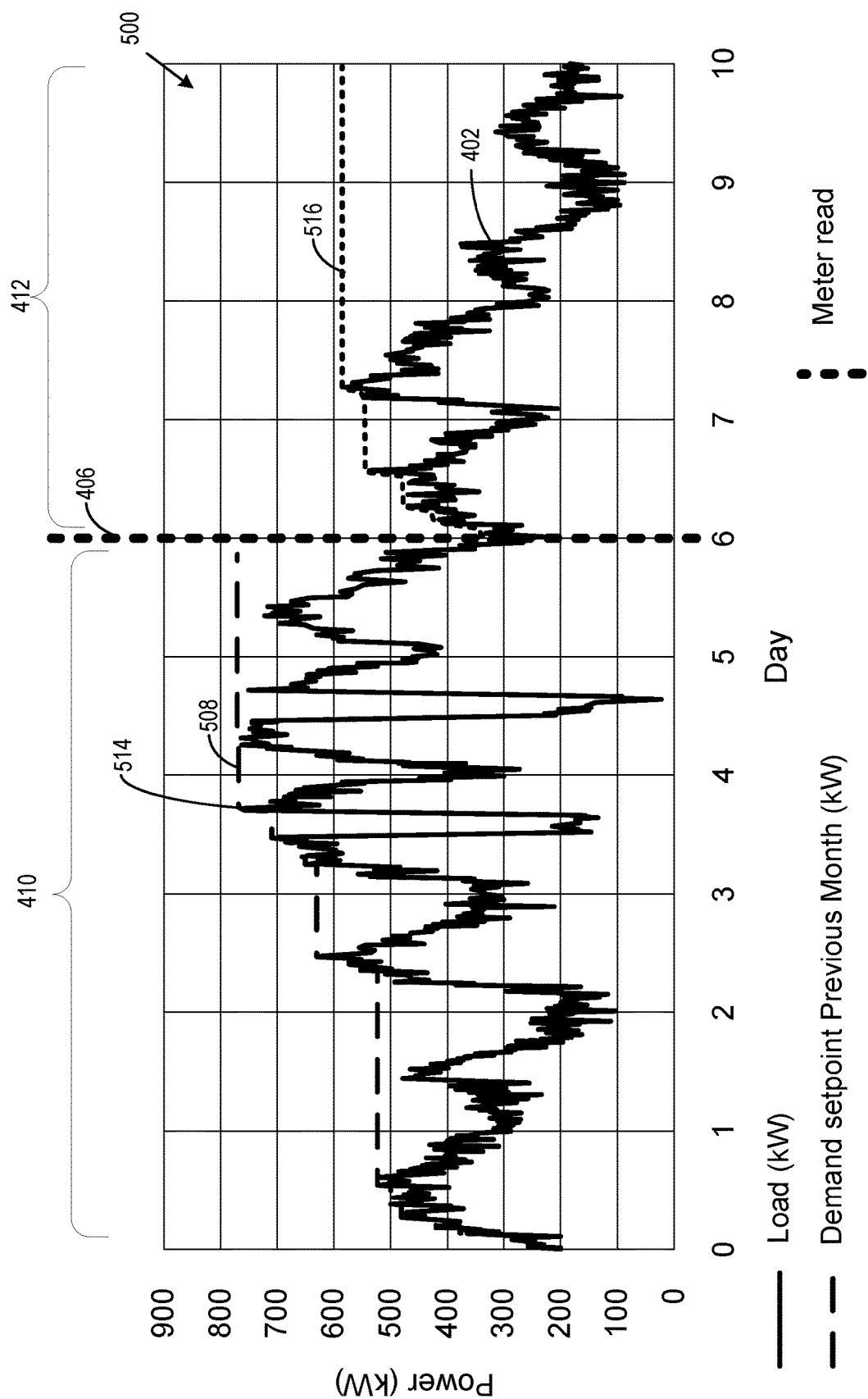
FIG. 5 illustrates a graph where a demand setpoint is reset at the time of a meter read.

FIG. 5 illustrates a graph 500 where a demand setpoint 508 is reset at the time of a meter read 406. Ideally, if the precise timing of a customer's meter read is known, the controller may reset the demand setpoint 508 for the first demand window 410 to 0 kW (or the most recently measured load value) just as a utility meter has reset its demand tracking value when the meter is read. The controller may then track to a more aggressive (lower) new demand setpoint value 516 for the second demand window 412.

As shown, the new demand setpoint value 516 is not dependent on the maximum power measurement 514 of the first demand window 510. This may allow the controller to have the new demand setpoint value 516 be lower than the demand setpoint 508 of the second demand window 412. When compared to the demand setpoint 404 of FIG. 4, the new demand setpoint value 516 for the second demand window 412 is significantly less.

Figure 6:
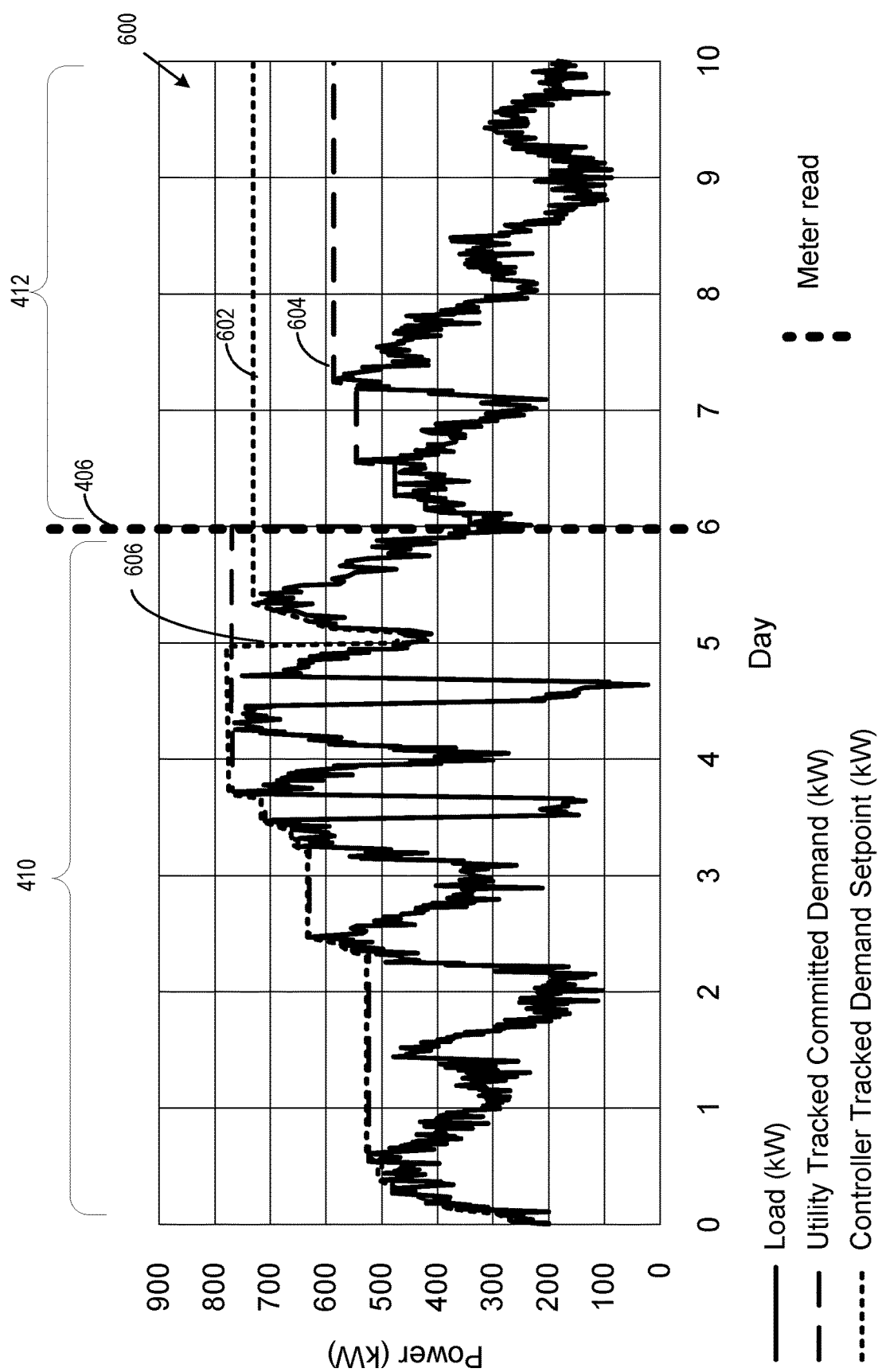
FIG. 6 illustrates a graph where a controller tracked demand setpoint is reset before the utility tracked committed demand is reset.

However, if the actual meter read 406 were to occur before or after (e.g., Day 5, or Day 7) the controller resets the demand set point value 508 to the new demand setpoint value 516, it may result in a discrepancy between the tracked demand values, sub-optimal control, and increased subsequent customer charges (e.g., see FIG. 6).

FIG. 6 illustrates a graph 600 where a controller tracked demand setpoint 602 is reset before the utility tracked committed demand 604 is reset. The utility tracked committed demand 604 is the committed demand that a utility tracks in order to determine demand charges for a billing period. The controller tracked demand setpoint 602 is the setpoint that the controller of the electrical system tracks and uses when determining how to control the electrical system. One way to optimize the operation of the system during a demand widow is to ensure that the utility tracked committed demand 604 and the controller tracked demand setpoint 602 are aligned. For example, if the actual meter read 406 and the controller demand reset 606 are aligned, the controller may more accurately track the utility tracked committed demand 604.

In the illustrated example, the controller resets the controller tracked demand setpoint 602 on Day 5 (i.e., controller demand reset 606). However, the utility is actually using a billing period that resets on Day 6. As day 5 has a higher maximum power measurement than any of the subsequent days, the controller tracked demand setpoint 602 is about 25% greater than the utility tracked committed demand 604. The error between the controller tracked demand setpoint 602 and the utility tracked committed demand 604 is caused by the controller anticipating the meter read occurrence before the actual meter read and reset happens.

Figure 7:
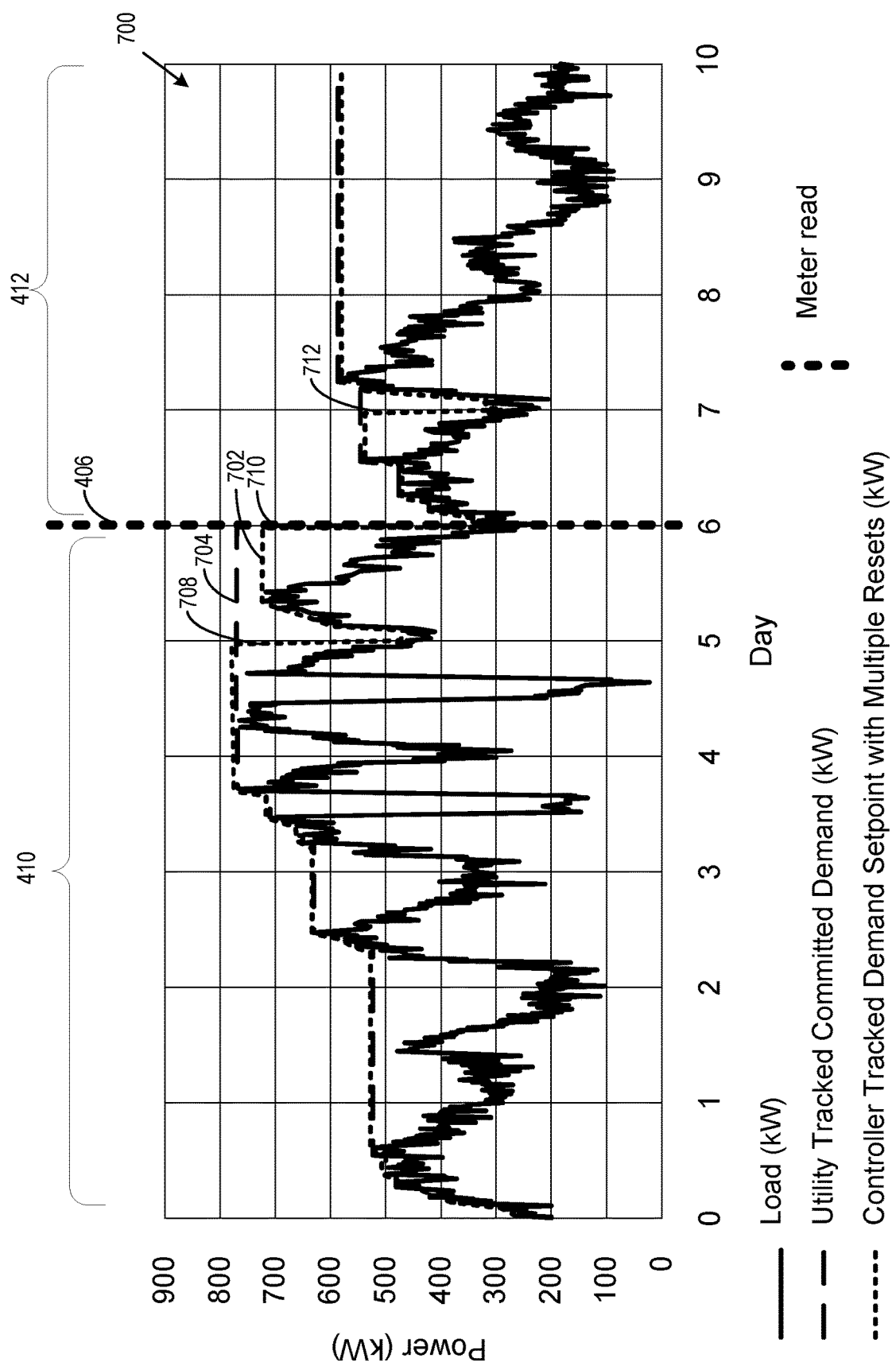
FIG. 7 illustrates a graph where a controller tracked demand setpoint is reset multiple times around an anticipated meter read occurrence, in accordance with some embodiments.
Figure 8:
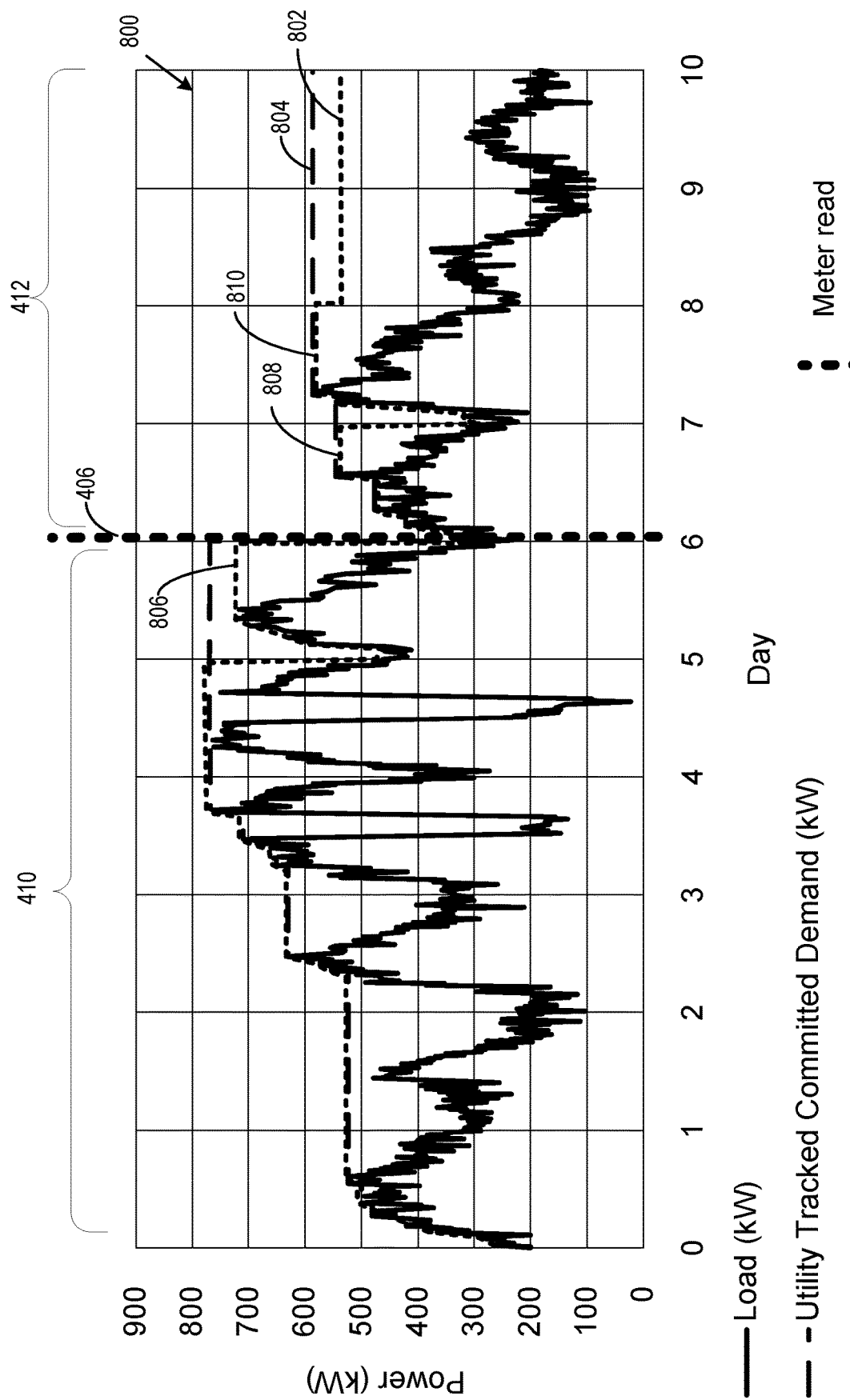
FIG. 8 illustrates a graph where a controller tracked demand setpoint is reset multiple times around an expected or actual meter read occurrence, in accordance with some embodiments

FIGS. 7 and 8 illustrates how multiple resets near the time of an anticipated meter read occurrence can reduce the error of a controller tracked demand setpoint.

FIG. 7 illustrates a graph 700 where a controller tracked demand setpoint 702 is reset multiple times around a meter read occurrence 406, in accordance with some embodiments of the present disclosure. In the embodiment illustrated in FIG. 7, the controller initiates the demand setpoint for the second demand window 412 based on the last reset.

The controller may attempt to resolve errors from uncertainty in the meter read time by performing multiple resets around the meter read 406. As shown, the meter read 406 occurs on Day 6 and the controller tracked demand setpoint 702 is reset before, on and after the meter read date . If the controller simply reset the controller tracked demand setpoint 702 once it may result in a much higher value for the second demand window 412 than the value of the utility tracked committed demand 704 (e.g., see FIG. 6). However, in the illustrated embodiment, the controller resets the value of the demand setpoint on Days 5 (i.e., first controller demand reset 708), 6 (i.e., second controller demand reset 710), and 7 (i.e., third controller demand reset 712), resulting in the controller tracked demand setpoint 702 and the utility tracked committed demand 704 being aligned.

While the illustrated embodiment resets the demand setpoint before, on, and after an anticipated meter read occurence, in some embodiments, the controller may only reset the demand setpoint on and after the meter read occurrence 406. In some embodiments, the controller tracked demand setpoint 702 can be reset on the anticipated meter read occurrence and both one day before and after the anticipated meter read occurrence. In FIG. 7, if the expected meter read occurrence is Day 6, the controller tracked demand setpoint 702 may be reset at the beginning of Days 5, 6 and 7.

By resetting on multiple points in time, the controller may reduce error and successfully tracks the utility tracked committed demand 704 on all subsequent days of the second demand window 412. This method can be used for even more resets (e.g. reset at the beginning of Days 4, 5, 6, 7 and 8), or resetting at a different frequency (e.g. every 12 hours or 36 hours instead of every 24 hours).

FIG. 8 illustrates a graph 800 where a controller tracked demand setpoint 802 is reset multiple times around an expected or actual meter read occurrence 406, in accordance with some embodiments. In the embodiment illustrated in FIG. 8, the controller initiates the demand setpoint for the second demand window 412 based on a lowest demand setpoint that occurs between the plurality of controller tracked demand setpoint resets.

In the embodiment of FIG. 7, the controller continues to track the demand setpoint from Day 7 (i.e., controller tracked after the last demand setpoint reset) for the subsequent days in the new month. In contrast, the embodiment of FIG. 8 chooses a controller tracked demand setpoint to track from the reset periods.

As shown in FIG. 8, interim demand setpoints (e.g., first demand setpoint 806, second demand setpoint 808, and third demand setpoint 810) may be established by the controller after each reset. In the illustrated embodiment, the controller tracked demand setpoint 802 is reset on Day 5, Day 6, and Day 7. For each of these days, the controller tracks a demand setpoint. The controller may choose which of the interim demand setpoints 806, 808, 810 to use to initiate the controller tracked demand setpoint 802 for the remainder of the second demand window 412.

In the illustrated example, the interim demand setpoint at the end of Day 6 was the minimum, so although a reset occurs on Day 7, the controller may use this minimum value for control purposes in all future days of the second demand window 412. Although in this embodiment the controller tracks a demand setpoint that is more aggressive (lower) than the utility, the method may provide a more conservative approach given the uncertainty of when the meter read occurred.

Figure 9:
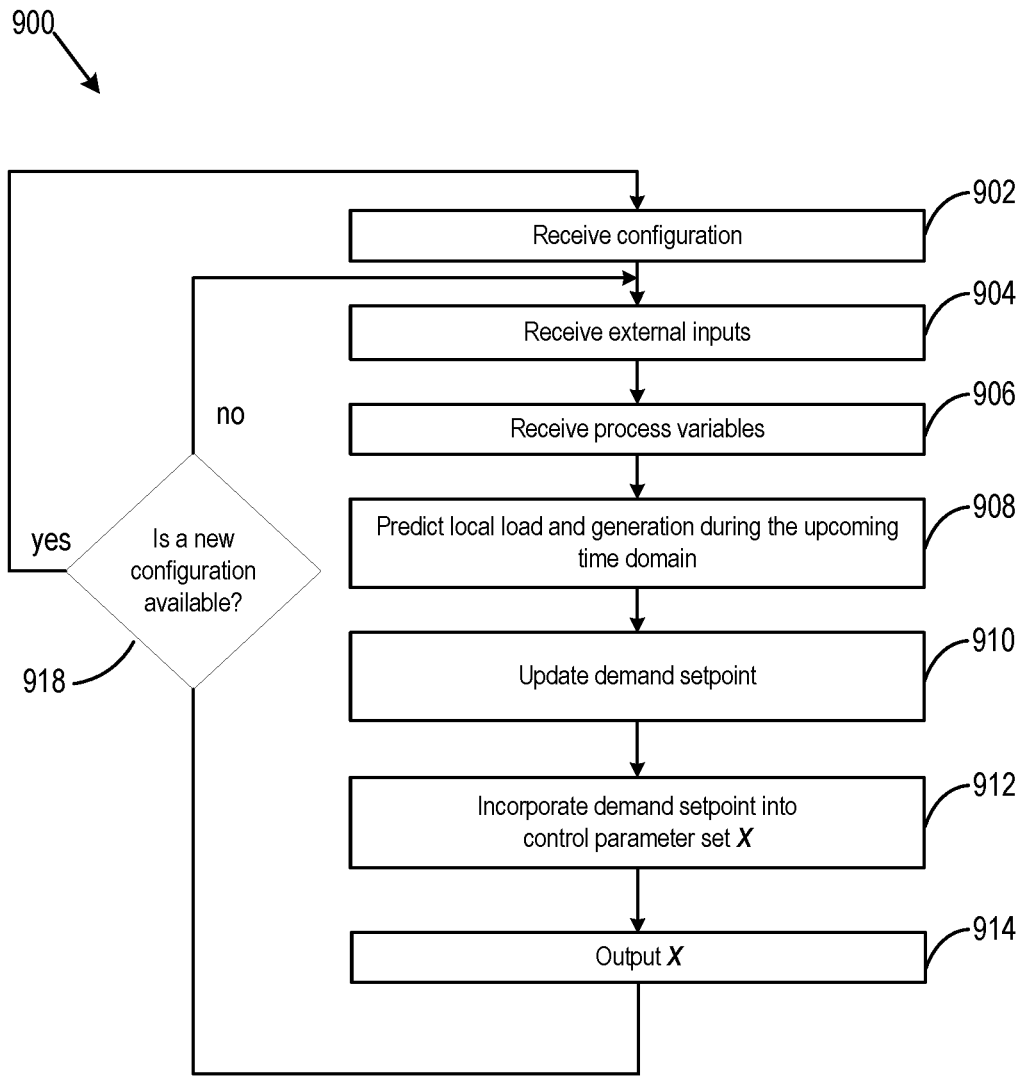
FIG. 9 is a flow diagram of a method of issuing a control parameter set, according to one embodiment of the present disclosure.

FIG. 9 is a flow diagram of a method 900 of issuing a control parameter set X according to one embodiment of the present disclosure. The method 900 may be a computer-implemented process executed by one or more computing devices. While there are many ways to define a control parameter set X, three possible approaches are:
1. a single set of parameters of a control law to be applied during the entire upcoming time domain;
2. a sequence of parameter sets that are each to be applied to a single control law at different contiguous sequential time intervals throughout the upcoming time domain; and
3. a sequence of parameters that specifies different control laws to be applied at different contiguous sequential time intervals throughout the future time domain.

The method 900 may receive 902 a configuration, or a set of configuration elements, of the electrical system. The configuration may specify one or more constraints of the electrical system. For example, the constraints may include a minimum battery state of charge that defines how far a battery may be depleted. The configuration may specify one or more constants of the electrical system and an electricity demand tariff providing demand rates and associated time windows.

External inputs may also be received 904. The external inputs may provide indication of one or more conditions that are external to the controller and/or the electrical system. For example, the external inputs may provide indication of the temperature, weather conditions (e.g., patterns, forecasts), and the like.

Process variables are received 906. The process variables provide one or more measurements of a current state of the electrical system. The set of process variables can be used to determine progress toward meeting an objective (e.g., more economical operation) of the electrical system. The process variables may be feedback in a control loop for controlling the electrical system.

The method 900 may include predicting 908 a local load and/or generation during an upcoming time domain. The predicted 908 local load and/or local generation may be stored for later consideration. For example, the predicted 908 load and/or generation may be used in a later process of evaluating (e.g., determining, simulating operation of the electrical system using) the demand setpoint in a future time period. In some embodiments, the local load and/or generation during the upcoming time domain may not be predicted. In some embodiments, the adjusted demand is continuously compared to the demand setpoint, and the demand setpoint is increased whenever the adjusted demand exceeds the demand setpoint by a target threshold.

A demand setpoint may be updated 910 to be applied during an upcoming or current time domain. The demand setpoint may be updated 910 using the update demand setpoint method 300 described above with reference to FIG. 3. Updating 910 the demand setpoint reduces the demand setpoint if the adjusted demand did not exceed the demand setpoint, and increases the demand setpoint if the adjusted demand did exceed the demand setpoint.

The updated demand setpoint is incorporated 912 into a control parameter set X. The control parameter set X is then output 914. In some embodiments, the control parameter set X may be altered based on the setpoint. In some embodiments, the output 914 of the control parameter set X may be stored locally, such as to memory, storage, circuitry, and/or a processor. In some embodiments, the outputting 914 may include transmission of the control parameter set X over a communication network to a remote computing device.

The method 900 repeats for a next upcoming time domain (a new upcoming time domain). A determination 918 is made whether a new configuration is available. If yes, then the demand method 900 receives 902 the new configuration. If no, then the method 900 may skip receiving 902 the configuration and simply receive 904 the external inputs.

Figure 10:
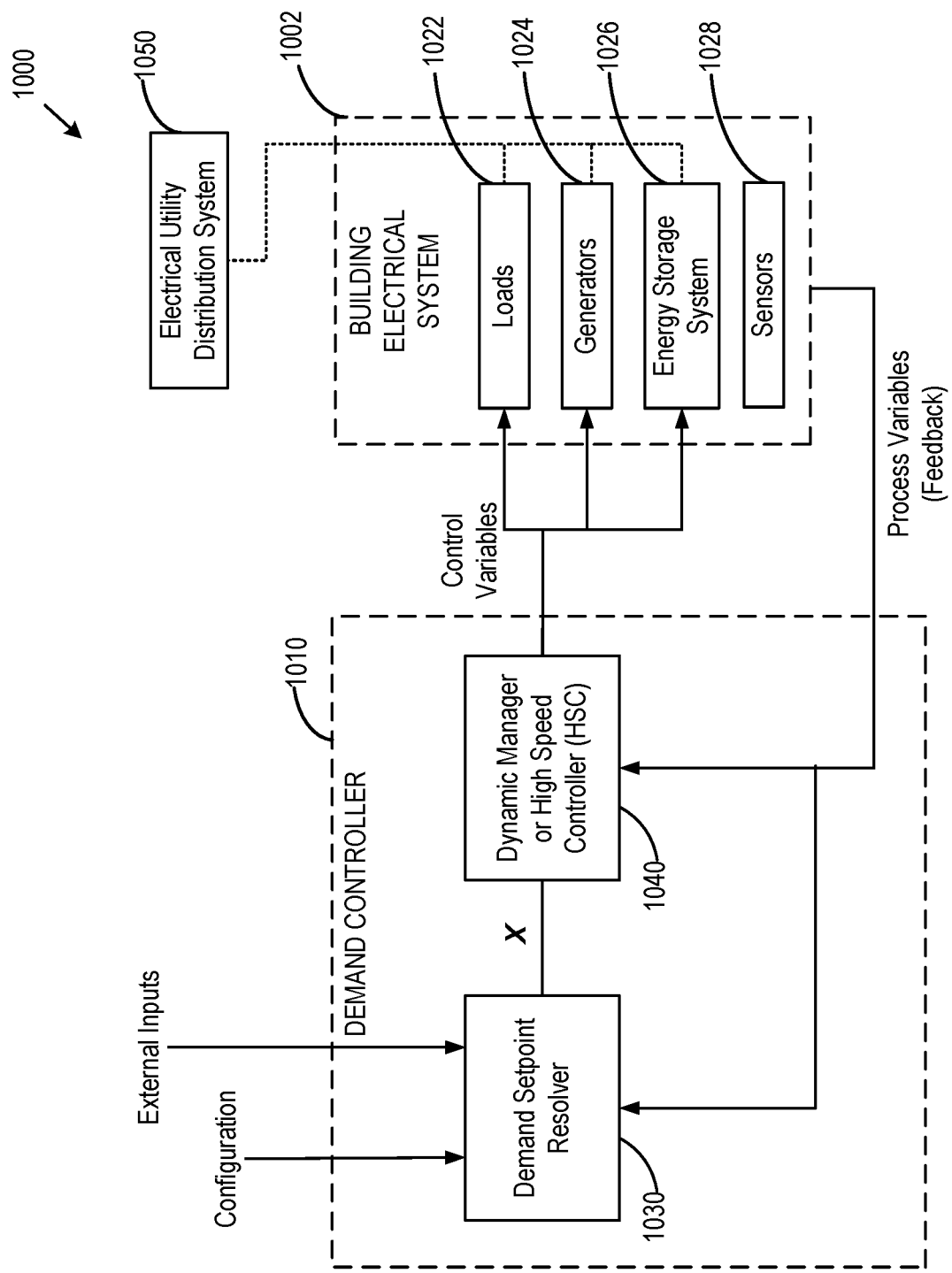
FIG. 10 is a control diagram of an electrical system with a demand controller, according to one embodiment.

FIG. 10 is a control diagram of an electrical system 1000 with a demand controller 1010, according to one embodiment. The demand controller 1010 generates control variables which control a building electrical system 1002 and cause an ESS 1026 to charge or generate (discharge) at different moments in time.

The electrical system 1000 comprises the building electrical system 1002 that is controlled by the demand controller 1010. The building electrical system 1002 includes one or more loads 1022, one or more generators 1024, the ESS 1026, and one or more sensors 1028 (e.g., meters) to provide measurements or other indication(s) of a state of the building electrical system 1002. The building electrical system 1002 is coupled to an electrical utility distribution system 1050, and therefore may be considered on-grid. Similar diagrams can be drawn for other applications such as a photovoltaic generator plant and an off-grid building.

The demand controller 1010 receives configuration information of the electrical system 1000, external inputs, and process variables and produces control variables to be sent to the electrical system 1000 to effectuate a change to the electrical system 1000 toward meeting a controller objective for the electrical system 1000. The demand controller 1010 may include electronic hardware and software to process the inputs (e.g., the configuration of the electrical system 1000, external inputs, and process variables) to determine values for each of the control variables. The demand controller 1010 may include one or more processors and suitable storage media to store programming in the form of executable instructions, which are executed by the processors to implement the control processes.

In the embodiment of FIG. 10, the demand controller 1010 includes a demand setpoint resolver 1030 and a dynamic manager 1040 (or high speed controller (HSC)). The demand setpoint resolver 1030 may perform method 500 of issuing a control parameter set X as described above with reference to FIG. 5 and may determine and/or adjust a demand setpoint as described above with reference to FIG. 3.

In the embodiment of FIG. 10, the demand setpoint resolver 1030 determines a demand setpoint as part of determining a set of values for a control parameter set X. The demand setpoint resolver 1030 provides the set of values and/or the control parameter set X to the HSC 1040 to effectuate a change to the electrical system 1000 to comply with the demand setpoint. The electrical system 1000 attempts to comply with the demand setpoint by maintaining power consumption below the demand setpoint. The demand setpoint resolver 1030 may use a demand setpoint algorithm to determine a set of values for the control parameter set X to effectuate a change to the electrical system 1000 to comply with the demand setpoint. In some embodiments, the demand setpoint algorithm may consider specific configuration and/or external inputs along with the process variables. Some examples of configuration information, external inputs, and process variables the charge algorithm may consider are:

Past, present, or future-predicted ESS state of charge
Past, present, and/or future time-of-use electricity supply rate
Past, present, and/or future demand rate
Charge power limits due to size of the ESS or energy conversion systems that are part of the ESS
ESS efficiency as a function of charge rate and state of charge
ESS energy storage device degradation rate as a function of state of charge and/or charge rate
Remaining time in charge control mode
ESS size
Past, present, or predicted unadjusted net load
Past, present, or predicted adjusted net load
Past, present, or predicted ESS power For example, if the past or present ESS power multiplied by remaining time in the future time domain is greater than the remaining ESS energy, the demand setpoint resolver 1030 may choose a control parameter set X that calls for a decrease in ESS power and an increase in generator power 1024 to comply with the demand setpoint.

The HSC 1040 utilizes the set of values for the control parameter set X to determine the control variables to communicate to the electrical system 1000. The control variables effectuate a change to the building electrical system 1002 to comply with the demand setpoint. For example, the control variables may cause the ESS 1026 to increase energy distribution to the loads 1022. The HSC 1040 in some embodiments is also presumed to have the ability to measure or obtain a current date and time. The two part approach of the demand controller 1010, namely the demand setpoint resolver 1030 determining control parameters and then the HSC 1040 determining the control variables, enables generation of a lasting set of controls, or a control solution (or plan) that can be used into the future rather than a single control to be applied at the present.

The two part approach of the demand controller 1010 enables the demand setpoint resolver 1030 to be disposed or positioned at a different location from the HSC 1040. In this way, intensive computing operations that may be involved in determining a demand setpoint and/or values for the control parameter set X can be performed by resources with higher processing capability that may be located remote from the building electrical system 1002. These intensive computing operations may be performed, for example, at a data center or server center (e.g., in the cloud).

In one embodiment, the demand controller 1010 and one or more of its components are executed as software or firmware (for example stored on non-transitory media, such as appropriate memory) by one or more processors. For example, the demand setpoint resolver 1030 may comprise one or more processors to process the inputs and generate the set of values for the control parameter set X. Similarly, the HSC 1040 may comprise one or more processors to process the control parameter set X and the process variables and generate the control variables. The processors may be computers, microcontrollers, CPUs, logic devices, or any other digital or analog device that can operate on preprogrammed instructions. If more than one processor is used, they can be connected electrically, wirelessly, or optically to pass signals between one another. In addition, the control variables can be communicated to the electrical system components electrically, wirelessly, or optically or by any other means. The processor has the ability to store or remember values, arrays, and matrices, which can be viewed as multi-dimensional arrays, in some embodiments. This storage may be performed using one or more memory devices, such as read access memory (RAM, disk drives, etc.).

Figure 11:
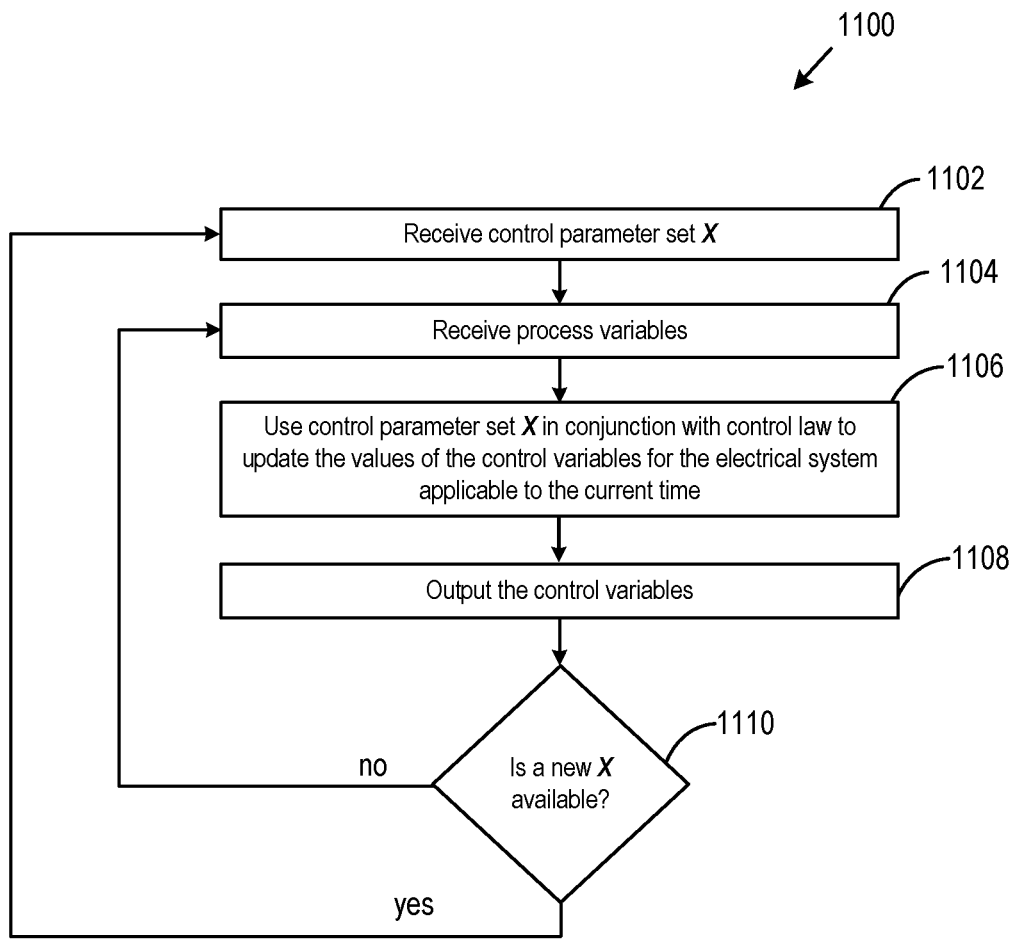
FIG. 11 illustrates a method that a high speed controller (HSC) may use to output control variables, according to one embodiment.

FIG. 11 illustrates a method 1100 that a HSC may implement or otherwise use to output control variables to control an electrical system, according to one embodiment. A control parameter set X is received 1102 (e.g., by the HSC). A set of process variables is received 1104. The output control variables may be updated 1106 subject to a set of predefined control laws and the control parameter set X, while observing the set of process variables. The control variables are output 1108 to an electrical system to control certain components of the electrical system and to accomplish the objective(s) of the controller.

Because the control parameter set X is passed to the HSC, the definition of the control parameters is tightly linked to the HSC's control law, in one embodiment. For example, in one example embodiment, a task of the HSC is to control some or all of the electrical system components within the electrical system based on the currently-applicable control parameter set X. The HSC can continue to control these components until a new set of control parameters is received 1110.

The time between receiving control parameters can be called a "time segment." In some embodiments, a battery energy storage system may have a rate at which the process variables are read and used by the HSC and new control variables are generated from 10 times per second to once per 15 minutes.

Defining or updating 1106 the control parameter set X involves defining or otherwise specifying times at which each control parameter is to be applied during a future time domain, and the control law(s) that are to be applied at each time in the future time domain.

One embodiment of a HSC for battery energy storage systems uses four parameters for each time segment. Each of the four parameters is defined in Table 1. In one embodiment, these parameters are used by the HSC to control the battery inverter to charge or discharge the energy storage. While there are many ways to define a control parameter set X, three possible approaches are:
1. a single set of parameters of a control law to be applied during the entire upcoming time domain;
2. a sequence of parameter sets that are each to be applied to a single control law at different contiguous sequential time intervals throughout the upcoming time domain; and
3. a sequence of parameters that specifies different control laws to be applied at different contiguous sequential time intervals throughout the future time domain.

An example of Approach 1 above of a single set of parameters of the control parameter set X (and example values) for a four-parameter control law is shown in Table 1, below.

In one embodiment of a HSC with the parameter set shown in Table 1, the parameter UB can be set equal to the demand setpoint. In some embodiments, the parameter $UB_0$ may be set to a demand setpoint.

Another aspect of the HSC in one disclosed embodiment is that it can also be used to curtail a generator (such as a photovoltaic generator) if necessary to maintain the lower bound on electrical system power consumption specified by LB.

In some embodiments, the parameter set may have fewer or more parameters than the four. For example, some embodiments may include only three parameters: $P_{nom}$, UB, and LB. Alternately, some embodiments may include only two parameters: $P_{nom}$ and UB. Alternately, some embodiments may include only UB or only $P_{nom}$ or any other combination of four or fewer parameters from the above list.

TABLE 1

| Parameter | Description | Example Value |
|---|---|---|
| $P_{nom}$ | Nominal ESS power (or discharge power if negative) to be applied in the absence of other constraints or rules (such as those related to UB, $UB_0$, or LB below). | −10 kW |
| UB | Upper bound on adjusted demand (e.g., an upper setpoint). Not to be exceeded unless the ESS is incapable of discharging at sufficient power. | 100 kW |
| $UB_0$ | Upper bound on electrical system adjusted demand (e.g., an upper setpoint) not to be actively exceeded (e.g., electrical system adjusted demand may exceed this value only with ESS power less than or equal to 0). | 80 kW |
| LB | Lower bound on adjusted net power (e.g., a lower setpoint). Sometimes referred to as "minimum import," or, if 0, "zero export." Adjusted net power will be kept above this value unless the ESS is incapable of charging at sufficient power and generators cannot be throttled sufficiently. | 0 kW |

Figure 12:
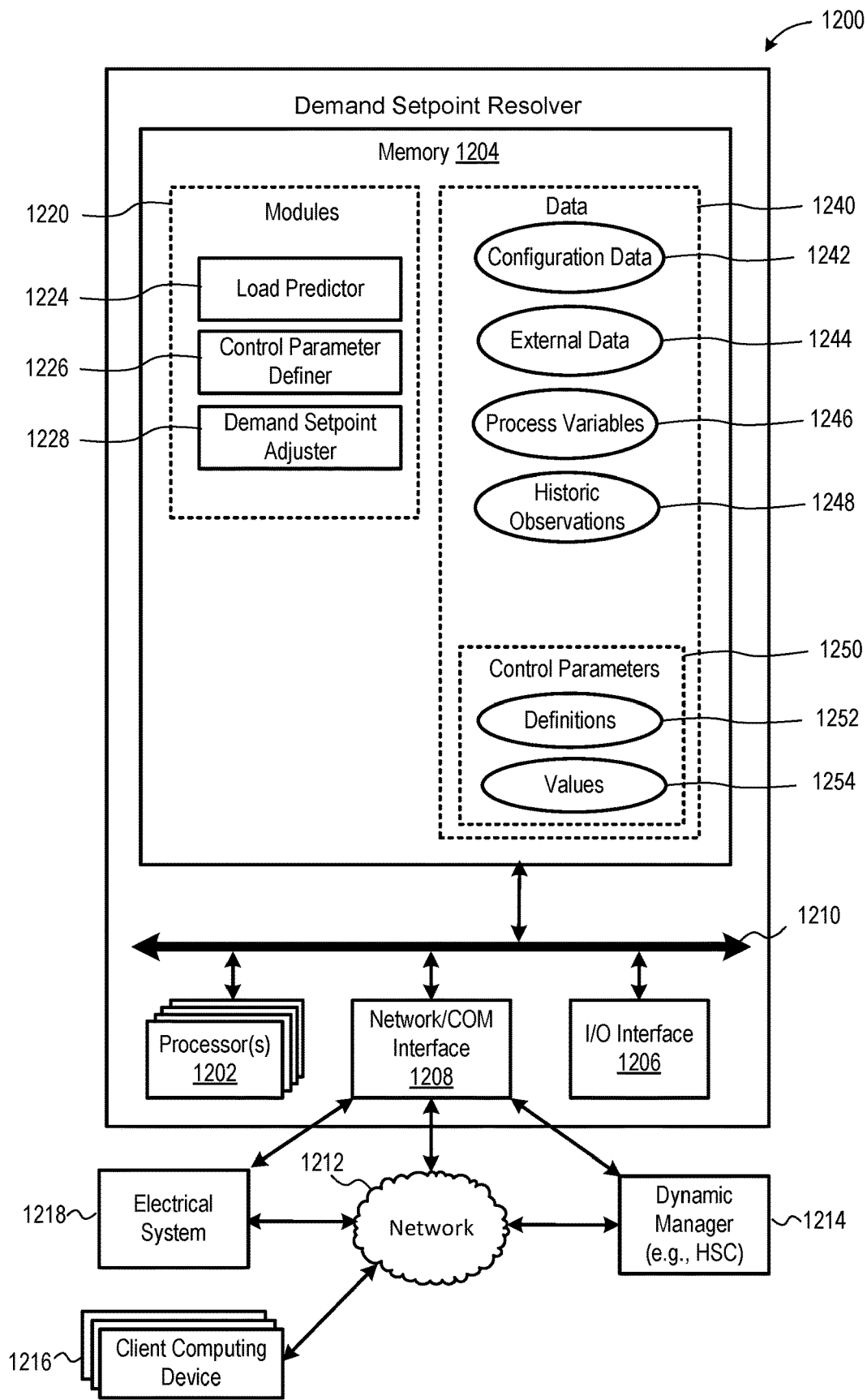
FIG. 12 is a diagram of a demand setpoint resolver, according to one embodiment of the present disclosure.

FIG. 12 is a diagram of a demand setpoint resolver 1200 according to one embodiment of the present disclosure. The demand setpoint resolver 1200 may determine a control plan for managing control of an electrical system 1218 during an upcoming time domain and provide the control plan as output. The determined control plan may include a demand setpoint and a plurality of sets of parameters each to be applied for a different time segment within an upcoming time domain. The demand setpoint resolver 1200 may determine the control plan based on a set of configuration elements specifying one or more constraints of the electrical system 1218 and defining one or more demand windows associated with operation of the electrical system. The demand setpoint resolver 1200 may also determine the control plan based on a set of process variables that provide one or more measurements of a state of the electrical system 1218. The demand setpoint resolver 1200 may include one or more processors 1202, memory 1204, an input/output interface 1206, a network/COM interface 1208, and a system bus 1210.

The one or more processors 1202 may include one or more general purpose devices, such as an Intel®, AMD®, or other standard microprocessor. The one or more processors 1202 may include a special purpose processing device, such as an ASIC, SoC, SiP, FPGA, PAL, PLA, FPLA, PLD, or other customized or programmable device. The one or more processors 1202 perform distributed (e.g., parallel) processing to execute or otherwise implement functionalities of the present embodiments. The one or more processors 1202 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM®, OS/2® operating systems, and so forth.

The memory 1204 may include static RAM, dynamic RAM, flash memory, one or more flip-flops, ROM, CD-ROM, DVD, disk, tape, or magnetic, optical, or other computer storage medium. The memory 1204 may include a plurality of program modules 1220 and a data 1240.

The program modules 1220 may include all or portions of other elements of the demand setpoint resolver 1200. The program modules 1220 may run multiple operations concurrently or in parallel by or on the one or more processors 1202. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, cause a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, subsystems and/or the like.

The system memory 1204 may also include the data 1240. Data generated by the demand setpoint resolver 1200, such as by the program modules 1220 or other modules, may be stored on the system memory 1204, for example, as stored program data 1240. The data 1240 may be organized as one or more databases.

The input/output interface 1206 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 1208 may facilitate communication or other interaction with other computing devices (e.g., a dynamic manager 1214) and/or networks 1212, such as the Internet and/or other computing and/or communications networks. The network/COM interface 1208 may be equipped with conventional network connectivity, such as, for example, Ethernet (IEEE 1202.3), Token Ring (IEEE 1202.5), Fiber Distributed Datalink Interface (FDDI), or Asynchronous Transfer Mode (ATM). Further, the network/COM interface 1208 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth. The network/COM interface 1208 may be any appropriate communication interface for communicating with other systems and/or devices.

The system bus 1210 may facilitate communication and/or interaction between the other components of the system, including the one or more processors 1202, the memory 1204, the input/output interface 1206, and the network/COM interface 1208.

The modules 1220 may include a load predictor 1224, a control parameter definer 1226, and a demand setpoint adjuster 1228.

The load predictor 1224 may predict a load on the electrical system 1218 during an upcoming time domain. The load predictor 1224 may utilize a historic profile or historic load observations.

The control parameter definer 1226 may generate, create, or otherwise define a control parameter set X, in accordance with a control law. The created control parameters 1250 may include a definition 1252 and a value 1254 and may be stored as data 1240.

The demand setpoint adjuster 1228 updates a demand setpoint based on a simulation process. In some embodiments, the demand setpoint adjuster 1228 may adjust the demand setpoint using the update demand setpoint method 300 described above with reference to FIG. 3. The demand setpoint adjuster 1228 may reset a controller tracked demand setpoint multiple times near each meter read occurrence.

The data 1240 may include configuration data 1242, external data 1244, process variables 1246, historic observations 1248, and control parameters 1250 (including definitions 1252 and values 1254).

The configuration data 1242 may be provided to, and received by, the demand setpoint resolver 1200 to communicate constraints and characteristics of the electrical system 1218.

The external data 1244 may be received as external input (e.g., weather reports, changing tariffs, fuel costs, event data), which may inform the determination of the optimal set of values. The external data 1244 may include a meter read schedule comprising meter read occurrences.

The process variables 1246 may be received as feedback from the electrical system 1218. The process variables 1246 are typically measurements of the electrical system 1218 state and are used to, among other things, determine how well objectives of controlling the electrical system 1218 are being met.

The historic observations 1248 are the record of process variables that have been received. A good example is the set of historic load observations that may be useful in a load predictor algorithm.

As noted earlier, the control parameter definer may create control parameters 1250, which may include a definition 1252 and a value 1254 and may be stored as data 1240.

The demand setpoint resolver 1200 may provide one or more control parameters 1250 as a control parameter set X to the dynamic manager 1214 via the network/COM interface 1208 and/or via the network 1212. The dynamic manager 1214 may then utilize the control parameter set X to determine values for a set of control variables to deliver to the electrical system 1218 to effectuate a change to the electrical system 1218 toward meeting one or more objectives (e.g., improved economic operation) for controlling the electrical system 1218.

In other embodiments, the demand setpoint resolver 1200 may communicate the control parameter set X directly to the electrical system 1218 via the network/COM interface 1208 and/or via the network 1212. In such embodiments, the electrical system 1218 may process the control parameter set X directly to determine control commands, and the dynamic manager 1214 may not be included.

In still other embodiments, the demand setpoint resolver 1200 may determine values for a set of control variables (rather than for a control parameter set X) and may communicate the set of values for the control variables directly to the electrical system 1218 via the network/COM interface 1208 and/or via the network 1212.

One or more client computing devices 1216 may be coupled via the network 1212 and may be used to configure, provide inputs, or the like to the demand setpoint resolver 1200, the dynamic manager 1214, and/or the electrical system 1218.

Figure 13:
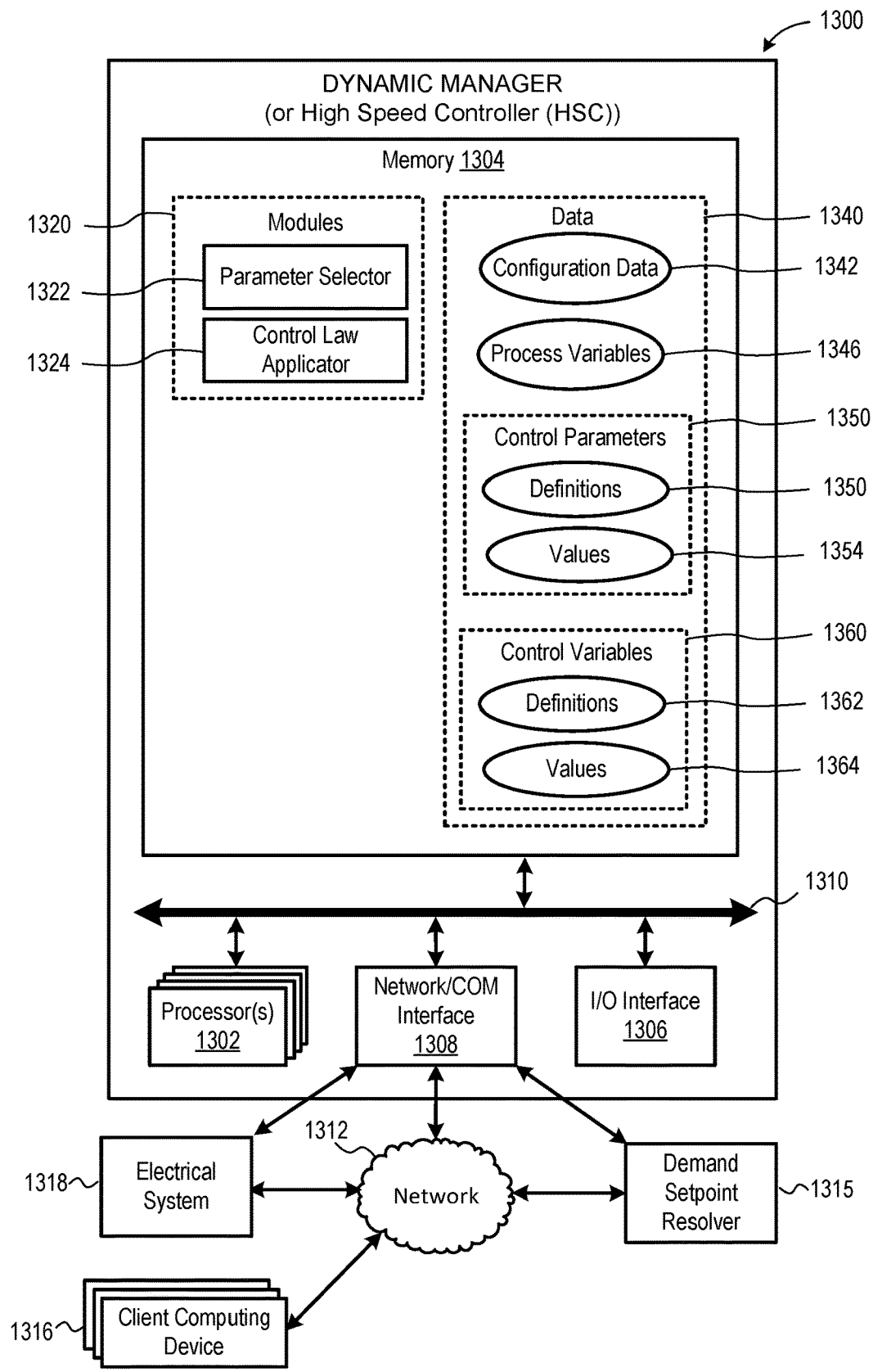
FIG. 13 is a diagram of a dynamic manager, according to one embodiment of the present disclosure.

FIG. 13 is a diagram of a dynamic manager 1300, according to one embodiment of the present disclosure. The dynamic manager 1300, according to one embodiment of the present disclosure, is a second computing device that may be separate from a demand setpoint resolver 1315, which may be similar to the demand setpoint resolver 1200 of FIG. 12. The dynamic manager 1300 may operate based on input (e.g., a control parameter set X) received from the demand setpoint resolver 1315. The dynamic manager 1300 may determine a set of control values for a set of control variables for a given time segment of the upcoming time domain and provide the set of control values to an electrical system 1318 to effectuate a change to the electrical system 1318 toward meeting an objective (e.g., more economical operation) of the electrical system 1318 during an upcoming time domain. The dynamic manager 1300 determines the set of control values based on a control law and a set of values for a given control parameter set X. The dynamic manager 1300 may include one or more processors 1302, memory 1304, an input/output interface 1306, a network/COM interface 1308, and a system bus 1310.

The one or more processors 1302 may include one or more general purpose devices, such as an Intel®, AMD®, or other standard microprocessor. The one or more processors 1302 may include a special purpose processing device, such as an ASIC, SoC, SiP, FPGA, PAL, PLA, FPLA, PLD, or other customized or programmable device. The one or more processors 1302 perform distributed (e.g., parallel) processing to execute or otherwise implement functionalities of the present embodiments. The one or more processors 1302 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 1304 may include static RAM, dynamic RAM, flash memory, one or more flip-flops, ROM, CD-ROM, DVD, disk, tape, or magnetic, optical, or other computer storage medium. The memory 1304 may include a plurality of program modules 1320 and a program data 1340.

The program modules 1320 may include all or portions of other elements of the dynamic manager 1300. The program modules 1320 may run multiple operations concurrently or in parallel by or on the one or more processors 1302. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor and/or computing device, causes the computing device and/or a computing system to implement certain processing steps, procedures, and/or operations, as disclosed herein. The modules, components, and/or facilities disclosed herein may be implemented and/or embodied as a driver, a library, an interface, an API, FPGA configuration data, firmware (e.g., stored on an EEPROM), and/or the like. In some embodiments, portions of the modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The system memory 1304 may also include data 1340. Data generated by the dynamic manager 1300, such as by the program modules 1320 or other modules, may be stored on the system memory 1304, for example, as stored program data 1340. The stored program data 1340 may be organized as one or more databases.

The input/output interface 1306 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network/COM interface 1308 may facilitate communication with other computing devices and/or networks 1312, such as the Internet and/or other computing and/or communications networks. The network/COM interface 1308 may couple (e.g., electrically couple) to a communication path (e.g., direct or via the network) to the electrical system 1318. The network/COM interface 1308 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network/COM interface 1308 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 1310 may facilitate communication and/or interaction between the other components of the system, including the one or more processors 1302, the memory 1304, the input/output interface 1306, and the network/COM interface 1308.

The modules 1320 may include a parameter selector 1322 and a control law applicator 1324.

The parameter selector may pick which set of parameters is to be used from the control parameter set X, according to a given time segment.

The control law applicator 1324 may process the selected set of parameters from the control parameter set X and convert or translate the individual set of parameters into control variables (or values thereof). The control law applicator 1324 may apply logic and/or a translation process to determine a set of values for a set of control variables based on a given set of parameters (from a control parameter set X) for a corresponding time segment. For example, the control law applicator 1324 may apply a method and/or logic as shown in FIG. 16.

The data 1340 may include configuration data 1342, process variables 1346, control parameters 1350 (including definitions 1350 and values 1354), and/or control variables 1360 (including definitions 1362 and values 1364).

The configuration data 1342 may be provided to, and received by, the dynamic manager 1300 to communicate constraints and characteristics of the electrical system 1318.

The process variables 1346 may be received as feedback from the electrical system 1318. The process variables 1346 are typically measurements of the electrical system 1318 state and are used to, among other things, determine how well objectives of controlling the electrical system 1318 are being met. Historic process variables 1346 may be utilized by the HSL for example to calculate demand which may be calculated as average building power over the previous 15 or 30 minutes. The dynamic manager 1300 can determine the set of control values for the set of control variables based on the process variables 1346.

The control parameters 1350 may comprise a control parameter set X that includes one or more sets of parameters each for a corresponding time segment of an upcoming time domain. The control parameters 1350 may additionally, or alternately, provide a control plan for the upcoming time domain. The control parameters 1350 may be received from a demand setpoint resolver 1315 as an optimal control parameter set $X_{opt}$.

The control variables 1360 may be generated by the parameter selector 1322 based on an optimal control parameter set $X_{opt}$.

The dynamic manager 1300 may receive the optimal control parameter set $X_{opt}$ from the demand setpoint resolver 1315 via the network/COM interface 1308 and/or via the network 1312. The dynamic manager 1300 may also receive the process variables from the electrical system 1318 via the network/COM interface 1308 and/or via the network 1312.

The dynamic manager 1300 may provide the values for the set of control variables to the electrical system 1318 via the network/COM interface 1308 and/or via the network 1312.

One or more client computing devices 1316 may be coupled via the network 1312 and may be used to configure, provide inputs, or the like to the demand setpoint resolver 1315, the dynamic manager 1300, and/or the electrical system 1318.

Example Embodiments

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

The described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc. that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The foregoing specification has been described with reference to various embodiments, including the best mode. However, those skilled in the art appreciate that various modifications and changes can be made without departing from the scope of the present disclosure and the underlying principles of the invention. Accordingly, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

Principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

Principles of the present disclosure may be reflected in a computer program implemented as one or more software modules or components. As used herein, a software module or component (e.g., engine, system, subsystem) may include any type of computer instruction or computer-executable code located within a memory device and/or computer-readable storage medium. A software module may, for instance, comprise one or more physical or logical blocks of computer instructions, which may be organized as a routine, a program, an object, a component, a data structure, etc. that perform one or more tasks or implement particular data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools.

Embodiments as disclosed herein may be computer-implemented in whole or in part on a digital computer. The digital computer includes a processor performing the required computations. The computer further includes a memory in electronic communication with the processor to store a computer operating system. The computer operating systems may include, but are not limited to, MS-DOS, Windows, Linux, Unix, AIX, CLIX, QNX, OS/2, and Apple. Alternatively, it is expected that future embodiments will be adapted to execute on other future operating systems.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Various operational steps, as well as components for carrying out operational steps, may be implemented in alternate ways depending upon the particular application or in consideration of any number of cost functions associated with the operation of the system, e.g., one or more of the steps may be deleted, modified, or combined with other steps.

While the principles of this disclosure have been shown in various embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure.

The scope of the present invention should, therefore, be determined only by the following claims.

The invention claimed is:

1. A controller for an electrical power system, the controller comprising:
   a memory to store
      a meter read schedule comprising anticipated meter read occurrences, wherein the anticipated meter read occurrences are based on when demand windows are expected to end, and
      a demand setpoint representing a desired upper limit of demand of an electrical power system;
   one or more processors operably coupled to the memory and configured to:
      adjust the demand setpoint during a billing period;
      provide at least one control value to the electrical power system to effectuate a change to the electrical power system to attempt to comply with the demand setpoint;
      determine multiple demand setpoint reset points based on the anticipated meter read occurrences, wherein the multiple demand setpoint reset points include, for each respective anticipated meter read occurrence, a first demand setpoint reset point at the respective anticipated meter read occurrence, a second demand setpoint reset point at a first time interval after the respective anticipated meter read occurrence, and a third demand setpoint reset point at a second time interval before the respective anticipated meter read occurrence, wherein the first time interval and the second time interval are each less than a length of a demand window associated with the respective anticipated meter read occurrence; and reset the demand setpoint multiple times at the first, second, and third demand setpoint reset points.

2. The controller of claim 1, wherein to reset the demand setpoint multiple times, the one or more processors:
reset the demand setpoint once before each anticipated meter read occurrence;
reset the demand setpoint once at each anticipated meter read occurrence; and
reset the demand setpoint once after each anticipated meter read occurrence.

3. The controller of claim 1, wherein the multiple demand setpoint reset points include a day before the anticipated meter read occurrence, a day after the anticipated meter read occurrence, and the anticipated meter read occurrence.

4. The controller of claim 1, wherein the multiple demand setpoint reset points include multiple reset points before the anticipated meter read occurrence, multiple reset points after the anticipated meter read occurrence, and a reset point on the anticipated meter read occurrence.

5. The controller of claim 1, wherein the demand setpoint is reset at a frequency of other than 24 hours.

6. The controller of claim 1, wherein the one or more processors are further configured to use a committed demand from after a last reset point to initiate the demand setpoint for a billing cycle.

7. The controller of claim 1, wherein the one or more processors are further configured to:
track committed demands between the different reset points and for an equivalent period after a last reset point; and
use a lowest committed demand from the tracked committed demands to initiate the demand setpoint for a billing cycle.

8. An electrical power control system, comprising:
one or more sensors coupled to an energy storage system and one or more loads of an electrical power system, the one or more sensors configured to measure power stored by the energy storage system, and demand of the electrical power system;
a controller coupled to the one or more sensors and the energy storage system, the controller configured to:
receive a meter read schedule comprising anticipated meter read occurrences, wherein the anticipated meter read occurrences are based on when demand windows are expected to end;
set a demand setpoint representing a desired upper limit of demand of the electrical power system;
adjust the demand setpoint during a billing period;
provide at least one control value to the electrical power system to effectuate a change to the electrical power system to attempt to comply with the demand setpoint;
determine multiple demand setpoint reset points based on the anticipated meter read occurrences, wherein the multiple demand setpoint reset points include, for each respective anticipated meter read occurrence, a first demand setpoint reset point at the respective anticipated meter read occurrence, a second demand setpoint reset point at a time interval after the respective anticipated meter read occurrence, and a third demand setpoint reset point at a second time interval before the respective anticipated meter read occurrence, wherein the first time interval and the second time interval are each less than a length of a demand window associated with the respective anticipated meter read occurrence ; and
reset the demand setpoint multiple times at the multiple demand setpoint reset points.

9. The electrical power control system of claim 8, wherein, to reset the demand setpoint multiple times, the controller is further configured to:
reset the demand setpoint once before each anticipated meter read occurrence;
reset the demand setpoint once at each anticipated meter read occurrence; and
reset the demand setpoint once after each anticipated meter read occurrence.

10. The electrical power control system of claim 8, wherein the multiple demand setpoint reset points include a day before the anticipated meter read occurrence, a day after the anticipated meter read occurrence, and the anticipated meter read occurrence.

11. The electrical power control system of claim 8, wherein the multiple demand setpoint reset points include multiple reset points before the anticipated meter read occurrence, multiple reset points after the anticipated meter read occurrence, and a reset point on the anticipated meter read occurrence.

12. The electrical power control system of claim 8, wherein the demand setpoint is reset at a frequency of other than 24 hours.

13. The electrical power control system of claim 8, wherein the controller is further configured to use a committed demand from after a last reset point to initiate the demand setpoint for a billing cycle.

14. The electrical power control system of claim 8, wherein the controller is further configured to:
track committed demands between the different reset points and for an equivalent period after a last reset point; and
use a lowest committed demand from the tracked committed demands to initiate the demand setpoint for a billing cycle.

15. A method for controlling an electrical system, the method comprising:
receiving a meter read schedule comprising anticipated meter read occurrences, wherein the anticipated meter read occurrences are based on when demand windows are expected to end;
setting a demand setpoint representing a desired upper limit of demand of the electrical power system;
adjusting the demand setpoint during a billing period;
providing at least one control value to the electrical power system to effectuate a change to the electrical power system to attempt to comply with the demand setpoint;
determining multiple demand setpoint reset points based on the anticipated meter read occurrences by, for each respective anticipated meter read occurrence, determining a first demand setpoint reset point at the respective anticipated meter read occurrence, a second demand setpoint reset point at a first time interval after the respective anticipated meter read occurrence, and a third demand setpoint reset point at a second time interval before the respective anticipated meter read occurrence, wherein the first time interval and the second time interval are each less than a length of a demand window associated with the respective anticipated meter read occurrence; and
resetting the demand setpoint multiple times at the first second, and third demand setpoint reset points.

16. The method of claim 15, the method further comprising:
- resetting the demand setpoint once before each anticipated meter read occurrence;
- resetting the demand setpoint once at each anticipated meter read occurrence; and
- resetting the demand setpoint once after each anticipated meter read occurrence.

17. The method of claim 15, wherein the multiple demand setpoint reset points include a day before the anticipated meter read occurrence, a day after the anticipated meter read occurrence, and the anticipated meter read occurrence.

18. The method of claim 15, wherein the multiple demand setpoint reset points include multiple reset points before the anticipated meter read occurrence, multiple reset points after the anticipated meter read occurrence, and a reset point on the anticipated meter read occurrence.

19. The method of claim 15, wherein the demand setpoint is reset at a frequency of less than or greater than 24 hours.

20. The method of claim 15, wherein the controller is further configured to use a committed demand from after a last reset point to initiate the demand setpoint for a billing cycle.

21. The method of claim 15, further comprising:
- tracking committed demands between the different reset points and for an equivalent period after a last reset point; and
- using a lowest committed demand from the tracked committed demands to initiate the demand setpoint for a billing cycle.

* * * * *